United States Patent
Kobayashi

(10) Patent No.: US 9,679,458 B2
(45) Date of Patent: Jun. 13, 2017

(54) INFORMATION PROCESSING SYSTEM, INFORMATION PROCESSING APPARATUS, INFORMATION PROCESSING METHOD, INFORMATION PROCESSING PROGRAM, PORTABLE COMMUNICATION TERMINAL, AND CONTROL METHOD AND CONTROL PROGRAM OF PORTABLE COMMUNICATION TERMINAL

(71) Applicant: NEC Corporation, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 37 days.

(21) Appl. No.: 14/433,802

(22) PCT Filed: Sep. 30, 2013

(86) PCT No.: PCT/JP2013/076518
§ 371 (c)(1),
(2) Date: Apr. 6, 2015

(87) PCT Pub. No.: WO2014/054573
PCT Pub. Date: Apr. 10, 2014

(65) Prior Publication Data
US 2015/0279183 A1    Oct. 1, 2015

(30) Foreign Application Priority Data
Oct. 4, 2012    (JP) .................. 2012-222559

(51) Int. Cl.
*H04W 4/22*    (2009.01)
*G08B 15/00*    (2006.01)
(Continued)

(52) U.S. Cl.
CPC .......... *G08B 15/001* (2013.01); *G05B 15/02* (2013.01); *G08B 13/19697* (2013.01);
(Continued)

(58) Field of Classification Search
CPC ...... G08B 15/00; G08B 25/016; G08B 13/91; H04W 4/22
See application file for complete search history.

(56) References Cited

U.S. PATENT DOCUMENTS

| 4,035,792 A | * | 7/1977 | Price | .................... | G07G 1/0027 109/54 |
| 2003/0156027 A1 | * | 8/2003 | Seo | ...................... | G08B 13/191 340/523 |

(Continued)

FOREIGN PATENT DOCUMENTS

| EP | 2128834 A1 | 12/2009 |
| FR | 298352 | * | 1/2012 |

(Continued)

OTHER PUBLICATIONS

International Search Report, Corresponding to PCT/JP2013/076518, dated Jan. 7, 2014, 1 page.
(Continued)

*Primary Examiner* — Myron K Wyche
(74) *Attorney, Agent, or Firm* — Wilmer Cutler Pickering Hale and Dorr LLP

(57) ABSTRACT

To readily and effectively take a crime and disaster prevention countermeasure, there is provided an information processing apparatus including an acquirer that, when a crime and disaster prevention assistant device is connected to a portable communication terminal, acquires specifying information for specifying the crime and disaster prevention assistant device from the crime and disaster prevention assistant device via the portable communication terminal, a driver executor that executes a driver program corresponding to the specifying information to control the crime and disaster prevention assistant device, and an application executor that executes a crime and disaster prevention application program corresponding to the specifying infor-
(Continued)

452

| STATUS DETECTION INFORMATION | COUNTERMEASURE PROCESSING | REPORT DESTINATION |
| --- | --- | --- |
| DETECTION OF SMOKE/RECOGNITION OF IMAGE OF FIRE | OPERATE SPRINKLER, OUTPUT EVACUATION GUIDANCE VOICE, DISPLAY EVACUATION ROUTE, AND OPEN DOOR | FIRE STATION/COMPANY (xxx-xxxx-xxxx) |
| DETECTION OF OPENING OF AUTOMATIC DOOR/RECOGNITION OF INTRUSION OF SUSPICIOUS PERSON | TURN ON CRIME PREVENTION LIGHT, OUTPUT EVACUATION GUIDANCE VOICE, OUTPUT INTIMIDATION ANNOUNCEMENT, AND OPEN DOOR (LOCK DOOR AFTER WORKERS AND CUSTOMERS ESCAPE) | SECURITY COMPANY (yy-yyyy-yyyy)/POLICE/ COMPANY (xxx-xxxx-xxxx) |
| DETECTION OF OPENING OF AUTOMATIC DOOR/RECOGNITION OF EXITING OF SUSPICIOUS PERSON | THROW COLOR BALL AT SUSPICIOUS PERSON | SECURITY COMPANY (yy-yyyy-yyyy)/POLICE/ COMPANY (xxx-xxxx-xxxx) |
| RECOGNITION OF IMAGE OF VIBRATION | OUTPUT EVACUATION GUIDANCE VOICE, DISPLAY EVACUATION ROUTE, AND DISPLAY POSITION OF EMERGENCY PROVISIONS | COMPANY (xxx-xxxx-xxxx) | mation to acquire status detection information detected by the crime and disaster prevention assistant device connected to the portable communication terminal, specifies countermeasure processing corresponding to the acquired status detection information with reference to a management database, and controls the crime and disaster prevention assistant device via the portable communication terminal based on the countermeasure processing.

18 Claims, 22 Drawing Sheets

(51) Int. Cl.
  *G08B 13/196*   (2006.01)
  *G08B 15/02*    (2006.01)
  *G05B 15/02*    (2006.01)
  *H04N 7/18*     (2006.01)
  *G08B 25/00*    (2006.01)
  *G08B 7/06*     (2006.01)

(52) U.S. Cl.
  CPC ........... *G08B 15/02* (2013.01); *G08B 25/007* (2013.01); *G08B 25/009* (2013.01); *H04N 7/18* (2013.01); *H04W 4/22* (2013.01); *G08B 7/066* (2013.01); *G08B 15/007* (2013.01)

(56) References Cited

U.S. PATENT DOCUMENTS

| | | | |
|---|---|---|---|
| 2008/0132199 A1* | 6/2008 | Hirata | G08B 25/016 455/404.2 |
| 2009/0181640 A1* | 7/2009 | Jones | G08B 13/196 455/404.2 |
| 2009/0295571 A1 | 12/2009 | Hosey | |
| 2011/0111786 A1* | 5/2011 | Rao | G06Q 10/10 455/517 |
| 2011/0248857 A1 | 10/2011 | Rutherford et al. | |
| 2015/0211885 A1 | 7/2015 | Rutherford et al. | |

FOREIGN PATENT DOCUMENTS

| | | | |
|---|---|---|---|
| JP | 29496295 | * | 10/1995 |
| JP | 02002056472 | * | 2/2002 |
| JP | 2003-032377 A | | 1/2003 |
| JP | 2003-296855 A | | 10/2003 |
| JP | 2004-040342 A | | 2/2004 |
| JP | 2007-193429 A | | 8/2007 |
| JP | 2010-218347 A | | 9/2010 |
| JP | 2011-008337 A | | 1/2011 |

OTHER PUBLICATIONS

Extended European Search Report issued by the European Patent Office for Application No. 13844364.3 dated Jun. 22, 2016 (8 pages).

* cited by examiner

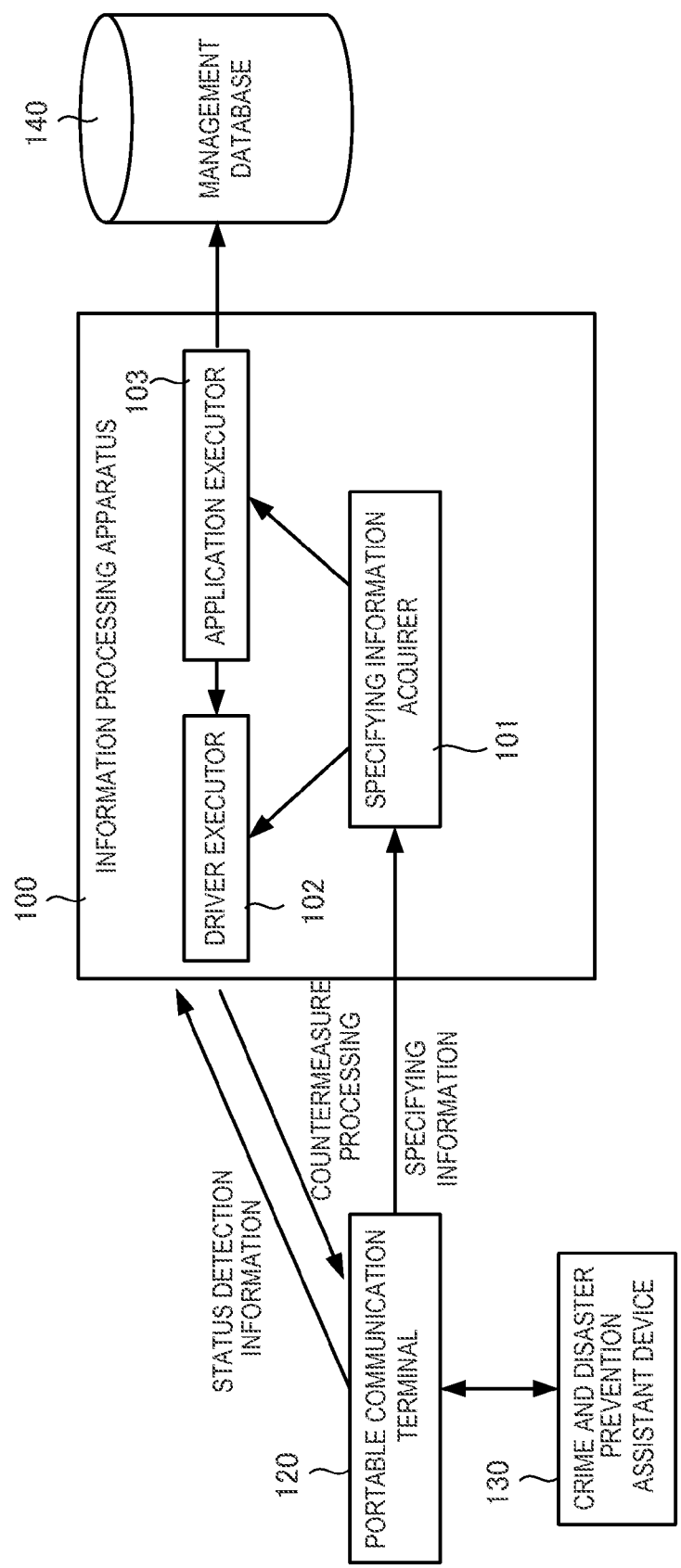

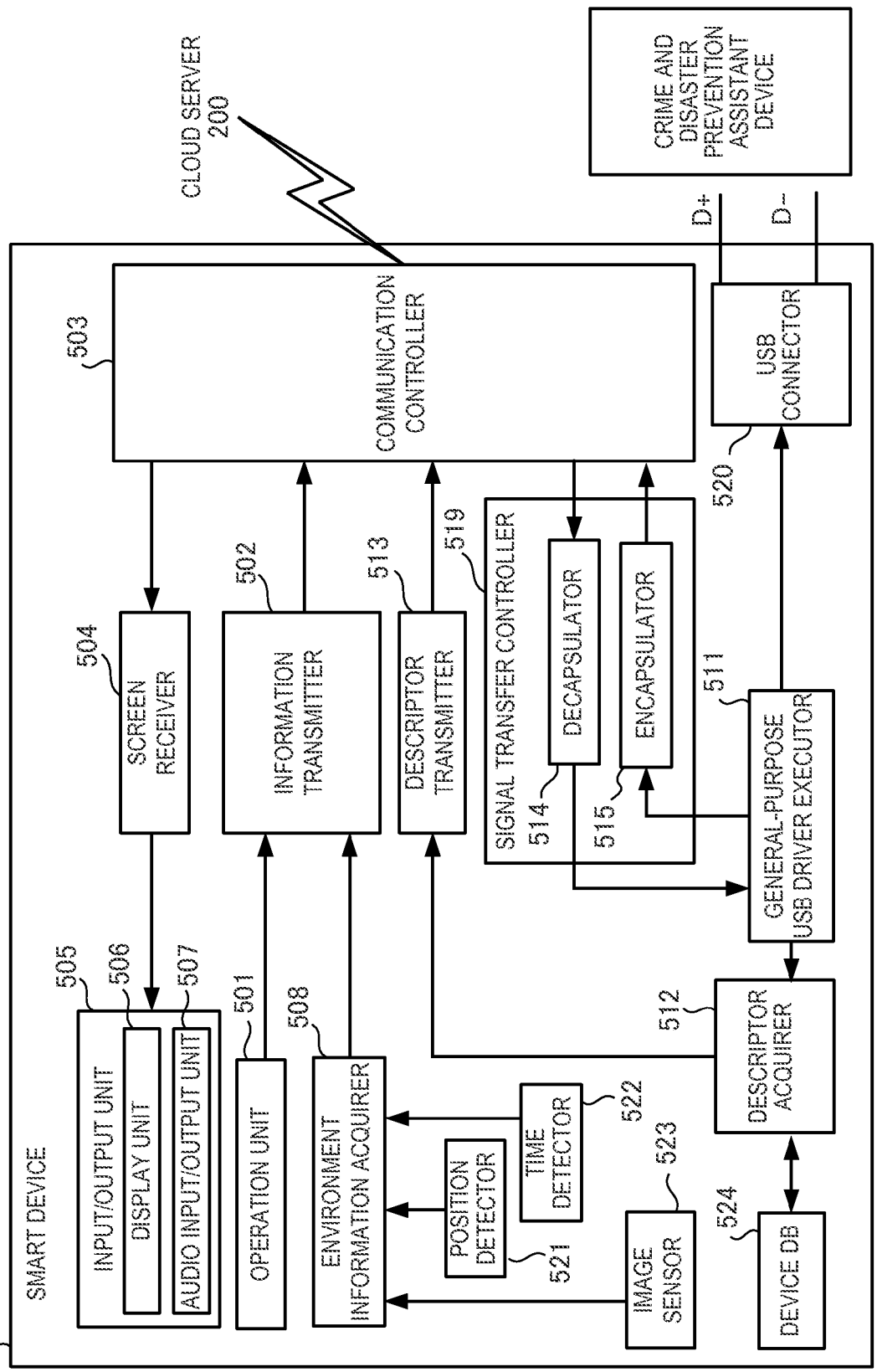

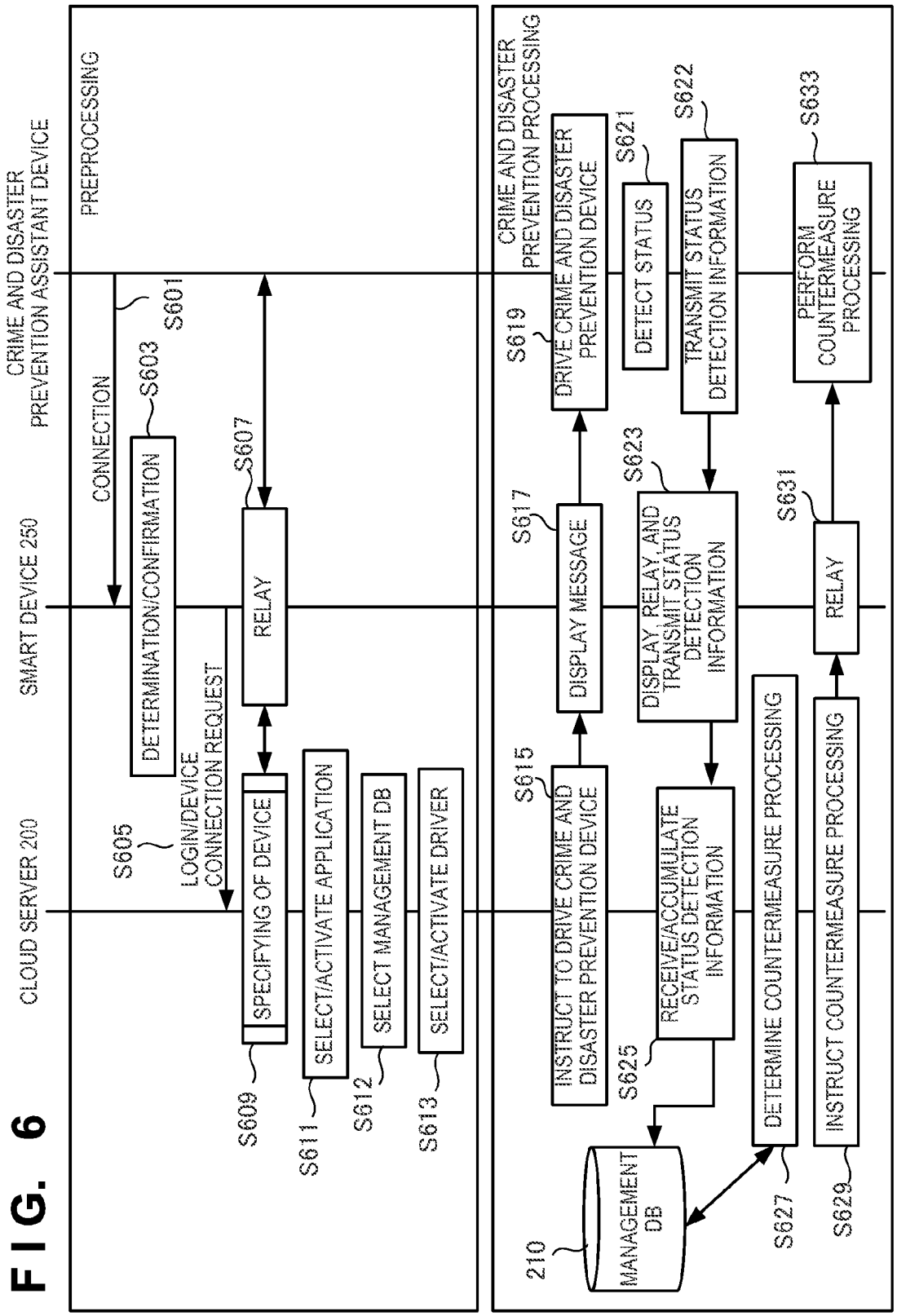

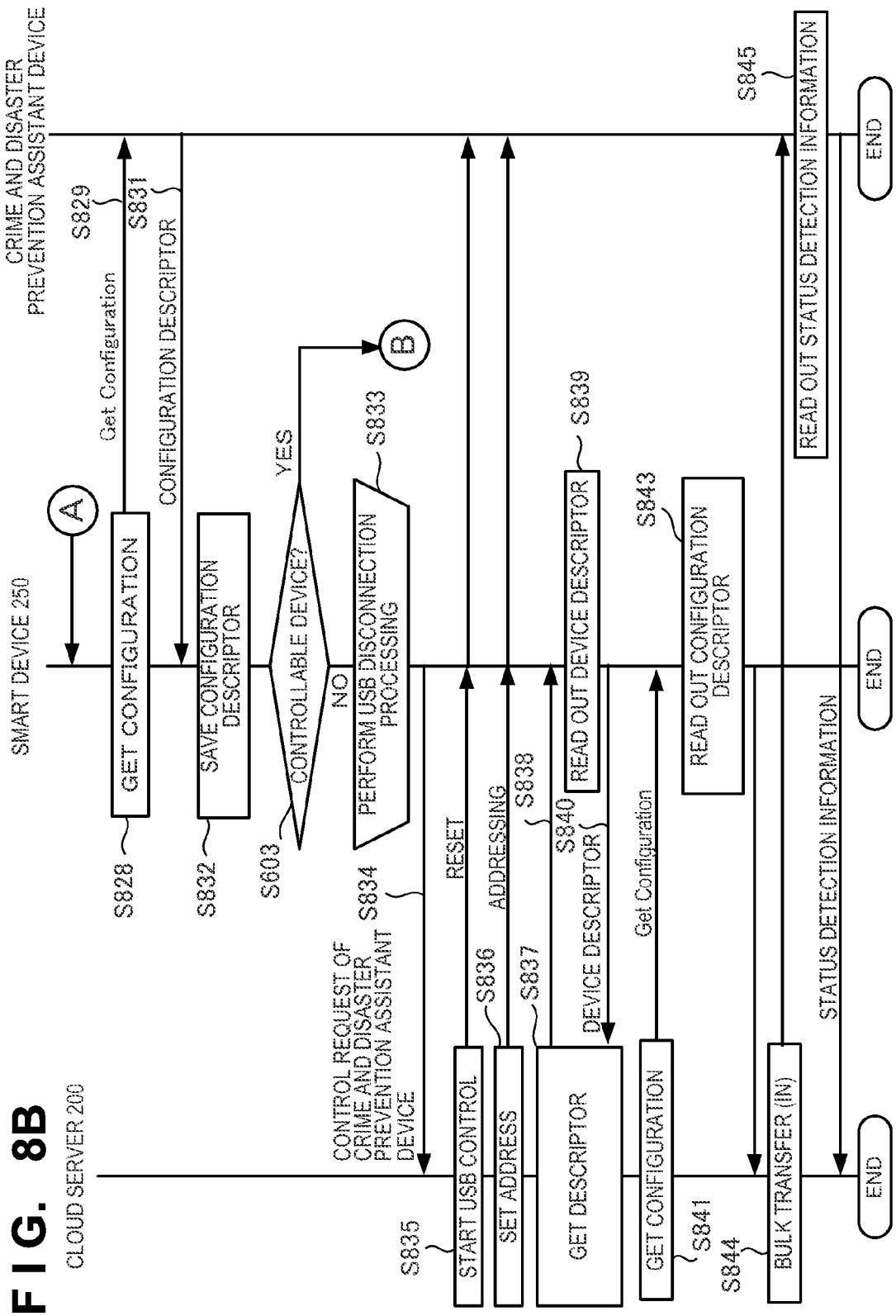

FIG. 10

| VENDOR ID | PRODUCT ID | SERIAL NO. | TRADE NAME | USE COMPANY | STORE | DB ADDRESS |
|---|---|---|---|---|---|---|
| | | | | | | |
| | | | | | | |
| | | | | | | |
| | | | | | | |

1001

451

| STORE SCENE | STORE SIZE | | |
|---|---|---|---|
| | ~30m² | 30~60m² | 60m²~ |
| OUTDOOR PERMANENT STORE | ONE VIDEO CAMERA, LOUDSPEAKER, CRIME PREVENTION LIGHT, FIRE SENSOR, OPEN/CLOSE SENSOR, CONTACTOR CONTROL APPARATUS | TWO VIDEO CAMERAS, TWO LOUDSPEAKERS, CRIME PREVENTION LIGHT, FIRE SENSOR, OPEN/CLOSE SENSOR, CONTACTOR CONTROL APPARATUS | THREE VIDEO CAMERAS, TWO LOUDSPEAKERS, CRIME PREVENTION LIGHT, FIRE SENSOR, OPEN/CLOSE SENSOR, PITCHING MACHINE, CONTACTOR CONTROL APPARATUS |
| INDOOR PERMANENT STORE | ONE VIDEO CAMERA, LOUDSPEAKER, CRIME PREVENTION LIGHT, FIRE SENSOR | TWO VIDEO CAMERAS, LOUDSPEAKER, CRIME PREVENTION LIGHT, FIRE SENSOR | THREE VIDEO CAMERAS, LOUDSPEAKER, CRIME PREVENTION LIGHT, FIRE SENSOR |
| OUTDOOR TEMPORARY STORE | ONE VIDEO CAMERA, LOUDSPEAKER, CRIME PREVENTION LIGHT, FIRE SENSOR | TWO VIDEO CAMERAS, LOUDSPEAKER, CRIME PREVENTION LIGHT, FIRE SENSOR | THREE VIDEO CAMERAS, LOUDSPEAKER, CRIME PREVENTION LIGHT, FIRE SENSOR |
| INDOOR TEMPORARY STORE | ONE VIDEO CAMERA, CRIME PREVENTION LIGHT | TWO VIDEO CAMERAS, LOUDSPEAKER, CRIME PREVENTION LIGHT | THREE VIDEO CAMERAS, LOUDSPEAKER, CRIME PREVENTION LIGHT |

| STATUS DETECTION INFORMATION | COUNTERMEASURE PROCESSING | REPORT DESTINATION |
|---|---|---|
| DETECTION OF SMOKE/RECOGNITION OF IMAGE OF FIRE | OPERATE SPRINKLER, OUTPUT EVACUATION GUIDANCE VOICE, DISPLAY EVACUATION ROUTE, AND OPEN DOOR | FIRE STATION/COMPANY (xxx-xxxx-xxxx) |
| DETECTION OF OPENING OF AUTOMATIC DOOR/RECOGNITION OF INTRUSION OF SUSPICIOUS PERSON | TURN ON CRIME PREVENTION LIGHT, OUTPUT EVACUATION GUIDANCE VOICE, OUTPUT INTIMIDATION ANNOUNCEMENT, AND OPEN DOOR (LOCK DOOR AFTER WORKERS AND CUSTOMERS ESCAPE) | SECURITY COMPANY (yy-yyyy-yyyy)/POLICE/ COMPANY (xxx-xxxx-xxxx) |
| DETECTION OF OPENING OF AUTOMATIC DOOR/RECOGNITION OF EXITING OF SUSPICIOUS PERSON | THROW COLOR BALL AT SUSPICIOUS PERSON | SECURITY COMPANY (yy-yyyy-yyyy)/POLICE/ COMPANY (xxx-xxxx-xxxx) |
| RECOGNITION OF IMAGE OF VIBRATION | OUTPUT EVACUATION GUIDANCE VOICE, DISPLAY EVACUATION ROUTE, AND DISPLAY POSITION OF EMERGENCY PROVISIONS | COMPANY (xxx-xxxx-xxxx) |

452

INFORMATION PROCESSING SYSTEM, INFORMATION PROCESSING APPARATUS, INFORMATION PROCESSING METHOD, INFORMATION PROCESSING PROGRAM, PORTABLE COMMUNICATION TERMINAL, AND CONTROL METHOD AND CONTROL PROGRAM OF PORTABLE COMMUNICATION TERMINAL

CROSS-REFERENCE TO RELATED APPLICATIONS

The present application is a national stage application of International Application No. PCT/JP2013/076518 entitled "Information Processing System, Information Processing Apparatus, Information Processing Method, Information Processing Program, Portable Communication Terminal, and Control Method and Control Program of Portable Communication Terminal," filed on Sep. 30, 2013, which claims the benefit of priority from Japanese Patent Application No. JP2012-222559, filed on Oct. 4, 2012, the disclosures of which are incorporated herein in their entirety by reference thereto.

TECHNICAL FIELD

The present invention relates to a crime and disaster prevention technique.

BACKGROUND ART

In the above technical field, paragraphs 0024, 0027, and 0029 of patent literature 1 disclose a monitoring apparatus including an observer, a coping unit, a monitoring plan executor, and a general monitoring knowledge storage. The monitoring plan executor inspects a monitoring target abnormality using the observer, decides an optimum coping behavior at the time of detection of an abnormality, and commands the coping unit to execute the coping behavior. The general monitoring knowledge storage stores a monitoring condition procedure, an abnormality detection procedure, and a coping behavior procedure for each monitoring target class.

In addition, in patent literature 2, paragraphs 0040 and 0049 describe that virtual PC software is active on a host server and the host server may be created by a plurality of PCs by a grid computing technique. Paragraph 0060 describes that setting is made so that the hardware resource of a client terminal can be used from a virtual PC.

Paragraph 0017 of patent literature 3 describes that a thin client system includes a thin client, a USB device connected to a USB port of the thin client, and a server connected via a network, and a portable communication terminal is preferable as the thin client. Paragraph 0029 describes that a USB virtual bus driver is a driver which behaves as a USB device included in the server itself when seen from the OS portion of the server.

CITATION LIST

Patent Literature

Patent literature 1: Japanese Patent Laid-Open No. 2003-296855

Patent literature 2: Japanese Patent Laid-Open No. 2007-193429

Patent literature 3: Japanese Patent Laid-Open No. 2010-218347

SUMMARY OF THE INVENTION

Technical Problem

In the techniques described in the above literatures, however, it is impossible to arrange a crime prevention system without carrying a PC having a sufficient storage capacity and throughput in a store. Especially, it is impossible to readily introduce a crime prevention system in a temporary store or house.

The present invention enables to provide a technique of solving the above-described problem.

Solution to Problem

One aspect of the present invention provides an information processing apparatus comprising:

an acquirer that, when a crime and disaster prevention assistant device is connected to a portable communication terminal, acquires specifying information for specifying the crime and disaster prevention assistant device from the crime and disaster prevention assistant device via the portable communication terminal;

a driver executor that executes a driver program corresponding to the specifying information to control the crime and disaster prevention assistant device; and an application executor that executes a crime and disaster prevention application program corresponding to the specifying information to acquire status detection information detected by the crime and disaster prevention assistant device connected to the portable communication terminal, specifies countermeasure processing corresponding to the acquired status detection information with reference to a management database, and controls the crime and disaster prevention assistant device via the portable communication terminal based on the countermeasure processing.

Another aspect of the present invention provides an information processing method comprising:

acquiring, when a crime and disaster prevention assistant device is connected to a portable communication terminal, specifying information for specifying the crime and disaster prevention assistant device from the crime and disaster prevention assistant device via the portable communication terminal;

executing a driver program corresponding to the specifying information to control the crime and disaster prevention assistant device; and executing a crime and disaster prevention application program corresponding to the specifying information to acquire status detection information detected by the crime and disaster prevention assistant device connected to the portable communication terminal, specifying countermeasure processing corresponding to the acquired status detection information with reference to a management database, and controlling the crime and disaster prevention assistant device via the portable communication terminal based on the countermeasure processing.

Still other aspect of the present invention provides a program for causing a computer to execute a method, comprising:

acquiring, when a crime and disaster prevention assistant device is connected to a portable communication terminal, specifying information for specifying the crime and disaster prevention assistant device from the crime and disaster prevention assistant device via the portable communication terminal;

executing a driver program corresponding to the specifying information to control the crime and disaster prevention assistant device; and executing a crime and disaster prevention application program corresponding to the specifying information to acquire status detection information detected by the crime and disaster prevention assistant device connected to the portable communication terminal, specifying countermeasure processing corresponding to the acquired status detection information with reference to a management database, and controlling the crime and disaster prevention assistant device via the portable communication terminal based on the countermeasure processing.

Still other aspect of the present invention provides a portable communication terminal comprising:

a determiner that, when connected to a crime and disaster prevention assistant device, determines whether a local terminal can control the crime and disaster prevention assistant device;

a requester that, when it is determined that the local terminal cannot control the crime and disaster prevention assistant device, requests control of the crime and disaster prevention assistant device by accessing a server;

a signal transfer controller that controls signal transfer between the crime and disaster prevention assistant device and the server so that communication between the crime and disaster prevention assistant device and the server can be established and the server can acquire status detection information detected by the crime and disaster prevention assistant device from the crime and disaster prevention assistant device; and a receiver that receives, from the server, screen information generated by executing, by the server, a crime and disaster prevention application program corresponding to the crime and disaster prevention assistant device.

Still other aspect of the present invention provides a control method of a portable communication terminal, comprising:

determining, when connected to a crime and disaster prevention assistant device, whether a local terminal can control the crime and disaster prevention assistant device;

requesting, when it is determined that the local terminal cannot control the crime and disaster prevention assistant device, control of the crime and disaster prevention assistant device by accessing a server;

controlling signal transfer between the crime and disaster prevention assistant device and the server so that communication between the crime and disaster prevention assistant device and the server can be established and the server can acquire status detection information detected by the crime and disaster prevention assistant device from the crime and disaster prevention assistant device; and receiving, from the server, screen information generated by executing, by the server, a crime and disaster prevention application program corresponding to the crime and disaster prevention assistant device.

Still other aspect of the present invention provides a control program of a portable communication terminal for causing a computer to execute a method, comprising:

determining, when connected to a crime and disaster prevention assistant device, whether a local terminal can control the crime and disaster prevention assistant device;

requesting, when it is determined that the local terminal cannot control the crime and disaster prevention assistant device, control of the crime and disaster prevention assistant device by accessing a server;

controlling signal transfer between the crime and disaster prevention assistant device and the server so that communication between the crime and disaster prevention assistant device and the server can be established and the server can acquire status detection information detected by the crime and disaster prevention assistant device from the crime and disaster prevention assistant device; and receiving, from the server, screen information generated by executing, by the server, a crime and disaster prevention application program corresponding to the crime and disaster prevention assistant device.

Still other aspect of the present invention provides a system comprising:

an information processing apparatus; and a portable communication terminal, said information processing apparatus comprising an acquirer that, when a crime and disaster prevention assistant device is connected to the portable communication terminal, acquires specifying information for specifying the crime and disaster prevention assistant device from the crime and disaster prevention assistant device via the portable communication terminal, a driver executor that executes a driver program corresponding to the specifying information to control the crime and disaster prevention assistant device, and an application executor that executes a crime and disaster prevention application program corresponding to the specifying information to acquire status detection information detected by the crime and disaster prevention assistant device connected to the portable communication terminal, specifies countermeasure processing corresponding to the acquired status detection information with reference to a management database, and controls the crime and disaster prevention assistant device via the portable communication terminal based on the countermeasure processing.

Advantageous Effects of Invention

According to the present invention, it is possible to readily and effectively take a crime and disaster prevention countermeasure.

BRIEF DESCRIPTION OF DRAWINGS

FIG. 1 is a block diagram showing the arrangement of an information processing apparatus according to the first embodiment of the present invention;

FIG. 5 is a block diagram showing the functional arrangement of a smart device according to the second embodiment of the present invention;

FIG. 6 is a sequence chart showing the processing sequence of the overall system including the cloud server according to the second embodiment of the present invention;

FIG. 8B is a sequence chart showing the example of the communication establishment processing between the server and the device in the information processing system according to the second embodiment of the present invention;

FIG. 10 is a table showing the structure of a device database used in the information processing system according to the second embodiment of the present invention;

FIG. 11 is a table showing the structure of a recommended crime and disaster prevention system database used in the information processing system according to the second embodiment of the present invention; and FIG. 12 is a table showing the structure of a crime and disaster prevention countermeasure database used in the information processing system according to the second embodiment of the present invention.

DESCRIPTION OF THE EMBODIMENTS

Figure 2A:
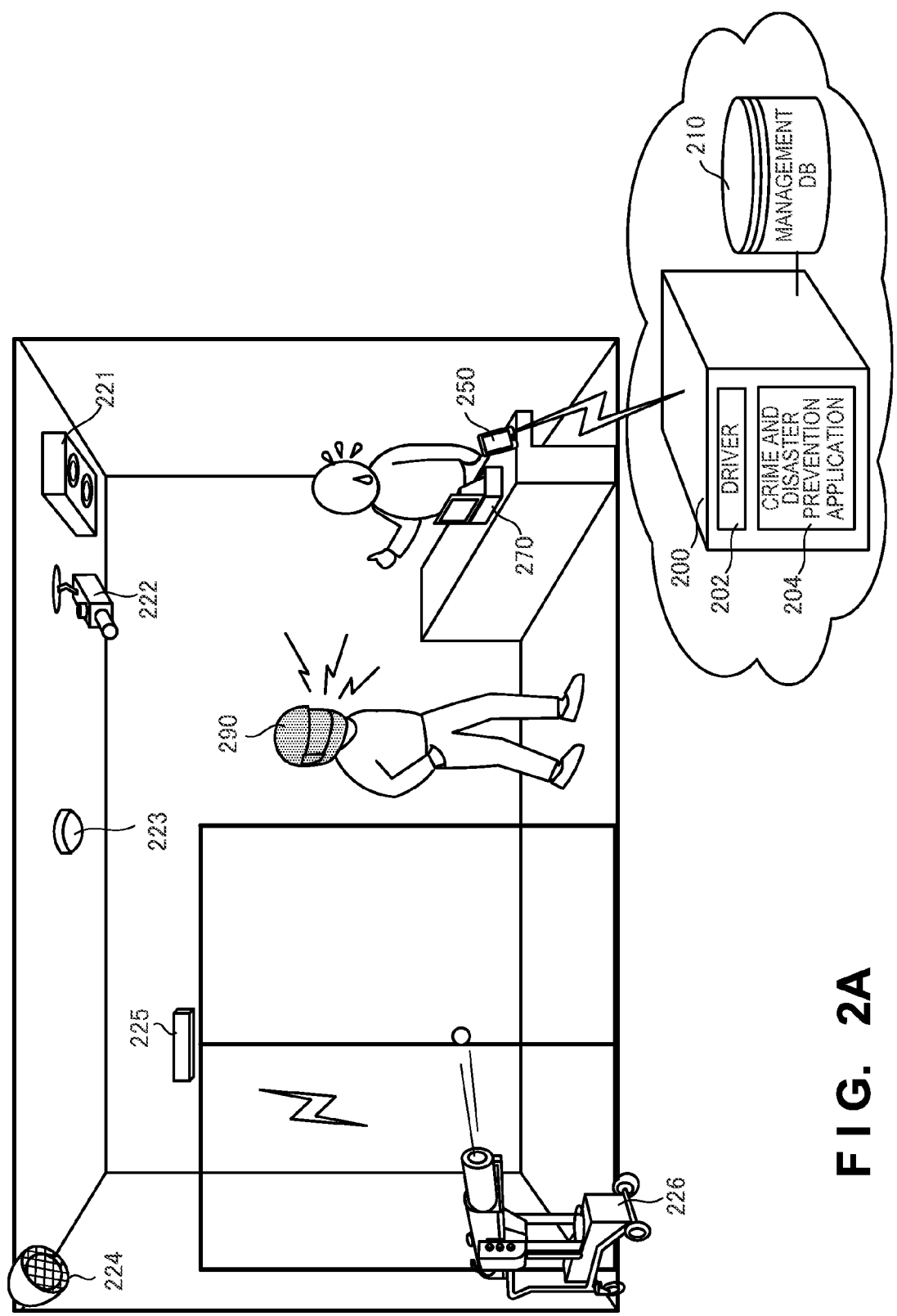
FIG. 2A is a view showing a method of using a cloud server according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 as the first embodiment of the present invention will be described with reference to FIG. 1. The information processing apparatus 100 includes a specifying information acquirer 101, a driver executor 102, and an application executor 103.

When a crime and disaster prevention assistant device 130 is connected to a portable communication terminal 120, the specifying information acquirer 101 acquires specifying information for specifying the crime and disaster prevention assistant device 130 from the crime and disaster prevention assistant device 130 via the portable communication terminal 120.

The driver executor 102 executes a driver program corresponding to the specifying information to control the crime and disaster prevention assistant device 130. Furthermore, the application executor 103 executes a crime and disaster prevention application program corresponding to the specifying information to acquire status detection information detected by the crime and disaster prevention assistant device 130 connected to the portable communication terminal 120. The application executor 103 specifies countermeasure processing corresponding to the acquired status detection information with reference to a management database 140, and controls the crime and disaster prevention assistant device 130 via the portable communication terminal 120 based on the countermeasure processing.

According to this embodiment, an information processing terminal can control a crime and disaster prevention device connected to a portable communication terminal without downloading any driver or application to the portable communication terminal, thereby readily and effectively taking a crime and disaster prevention countermeasure.

Second Embodiment

A cloud server 200 as an information processing apparatus according to the second embodiment of the present invention will be described with reference to FIGS. 2 to 12.

(Overall Arrangement)

Figure 2B:
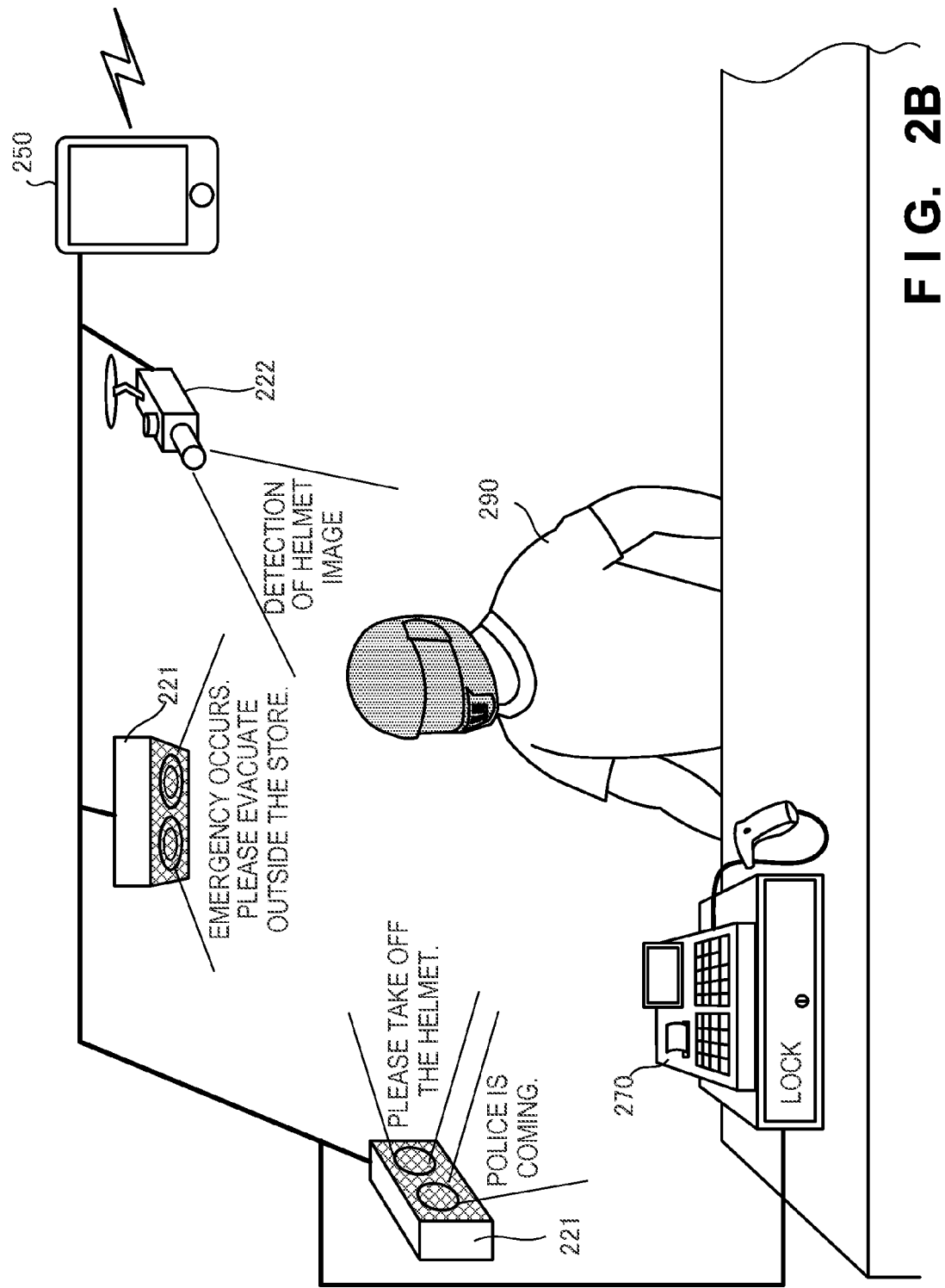
FIG. 2B is a view showing a method of using the cloud server according to the second embodiment of the present invention.
Figure 2C:
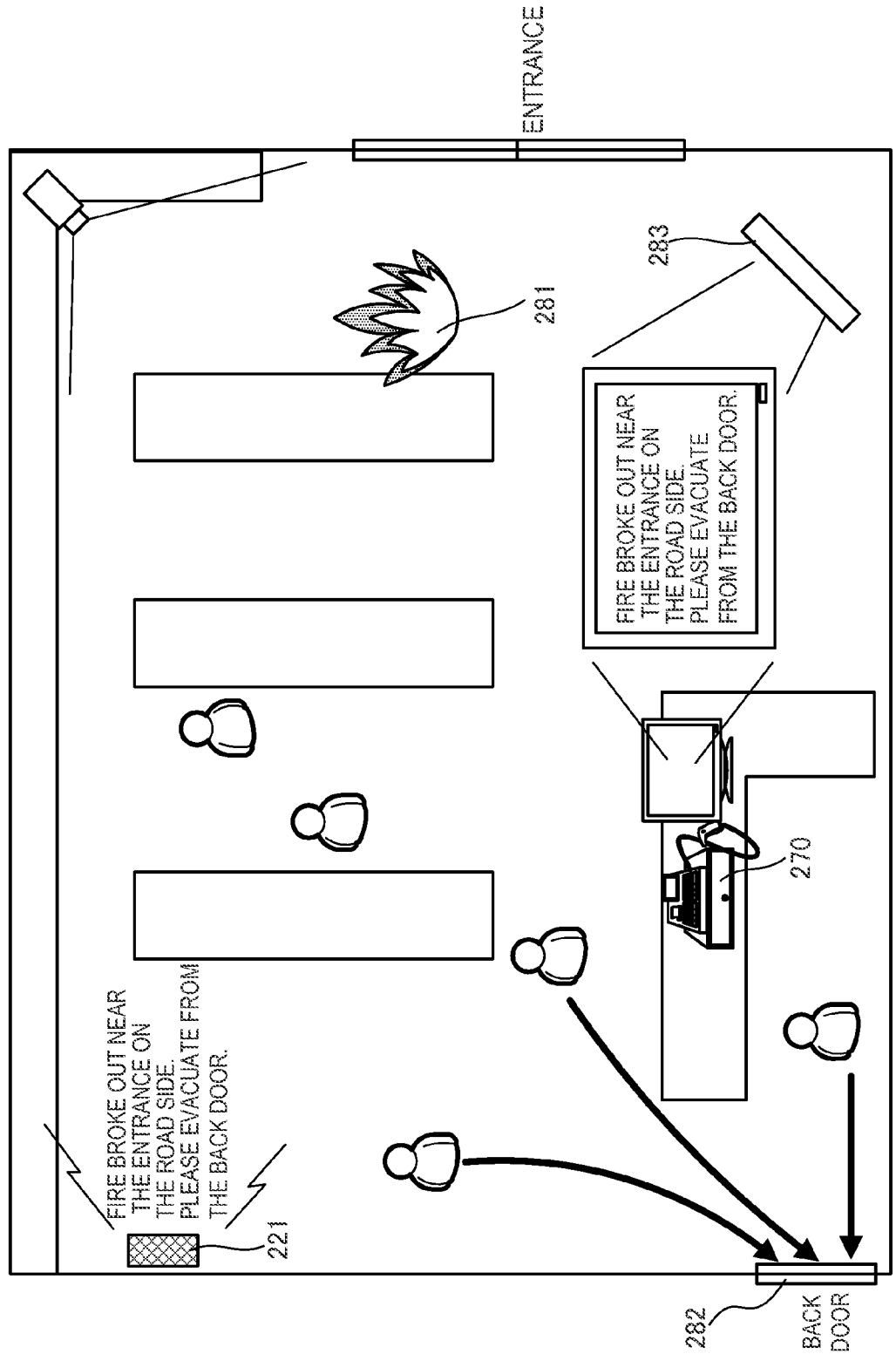
FIG. 2C is a view showing a method of using the cloud server according to the second embodiment of the present invention.

FIGS. 2A, 2B, and 2C are views each for explaining a scene in which a crime and disaster prevention system as a kind of information processing system including the cloud server 200 according to this embodiment is used.

The crime and disaster prevention system includes the cloud server 200 prepared on a network, and a smart device 250 serving as a portable communication terminal communicable with the cloud server 200 via a wireless communication network. The smart device 250 is connected to a loudspeaker 221, camera 222, human sensor 223, crime prevention light 224, door open/close sensor 225, automatic color ball pitching machine 226, contactor control apparatus (FIG. 3), and the like which are crime and disaster prevention assistant devices. The smart device 250 is also connected to a POS (Point Of Sale) terminal 270 installed in a store, and the like. The smart device 250 including a screen, microphone, and camera will be exemplified as a portable communication terminal for relaying and connecting the crime and disaster prevention assistant devices to the cloud server 200. The present invention, however, is not limited to this. An apparatus simply having a communication function, such as a mobile router, may be used as a portable communication terminal for relaying and connecting the crime and disaster prevention assistant devices to the cloud server 200.

Figure 3:
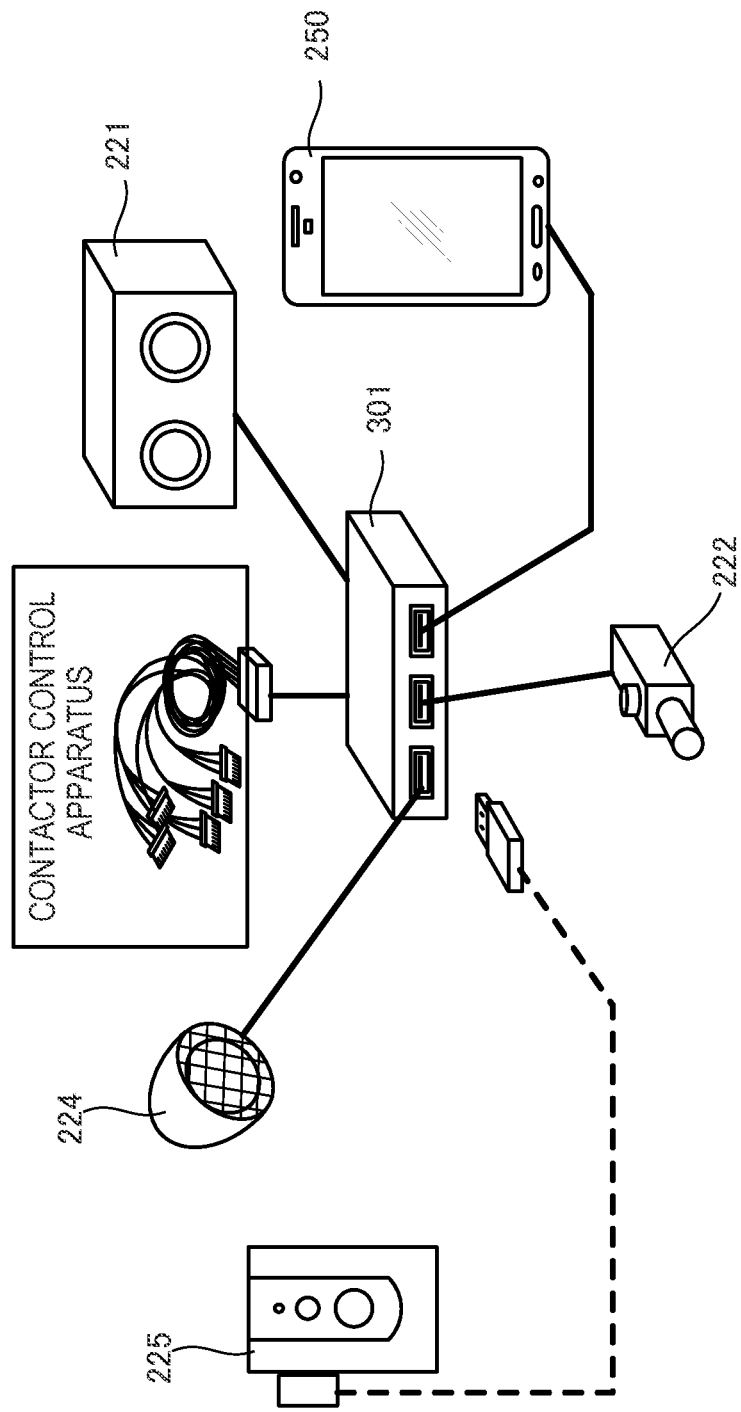
FIG. 3 is a view for explaining a crime and disaster prevention assistant device used together with the cloud server according to the second embodiment of the present invention.

The loudspeaker 221 is used to output a crime prevention sound (intimidation sound). The camera 222 can be used to determine the sex and age of each customer in a store in addition to detection of intrusion of a suspicious person, occurrence of a fire, and the like. The human sensor 223 senses the presence of persons and the number of persons. The crime prevention light 224 illuminates its surroundings with overwhelming brightness using accumulated power. The door open/close sensor 225 detects opening/closing of a door and an abnormal vibration (a vibration caused by intrusion by destruction). Furthermore, the contactor control apparatus controls locking and opening/closing of various doors and the POS terminal 270, and ON/OFF of the power of the apparatus. The automatic color ball pitching machine 226 is a machine for throwing a color ball at a criminal who is to run away. The color ball is a crime prevention ball containing a special dye. The smart device 250 may be additionally connected to a fire sensor (heat sensor or smoke sensor), a vibration sensor, a signage panel, and the like. These crime and disaster prevention assistant devices are connected to the smart device 250 via a USB hub 301 by wired or wireless connection, as shown in FIG. 3.

Upon detecting connection of the crime and disaster prevention assistant devices to the smart device 250 of the user, the cloud server 200 transmits, to the smart device 250, information indicating where and how these devices are installed. This allows the user to prepare a crime and disaster prevention system according to the status of a store without any expert knowledge. A combination of apparatuses may be proposed to maintain the safety of customers by increasing surveillance cameras in accordance with a customer stratum and a regional crime history (analysis indicating, for example, that many purse-snatching incidents targeting elderly people occurred).

In this example, the smart device 250 is connected to the crime and disaster prevention assistant devices via a USB (Universal Serial Bus) interface. However, the present invention is not limited to this, and the smart device 250 may be communicably connected to the crime and disaster prevention assistant devices via another communication interface (for example, an IEEE1394, HDMI®, Bluetooth®, or Wi-Fi® interface).

The cloud server 200 specifies the crime and disaster prevention assistant devices connected to the smart device 250, and executes a driver program 202 and a crime and disaster prevention application program 204 according to the crime and disaster prevention assistant devices. The smart device 250 then enters a monitoring status using the crime and disaster prevention assistant devices. The cloud server 200 acquires status detection information from each of the crime and disaster prevention assistant devices by executing the driver program 202. The status changes upon intrusion of a suspicious person, occurrence of a fire, opening/closing or an abnormal vibration of a door, or the like. The cloud server 200 specifies countermeasure processing corresponding to the acquired status detection information with reference to a management database 210. The cloud server 200 controls the crime and disaster prevention assistant devices via the smart device 250 based on the countermeasure processing.

More specifically, as shown in FIG. 2B, the cloud server 200 detects a helmeted suspicious person 290 from, for example, an image captured by the camera 222 by using an image processing technique such as pattern matching. In this case, the cloud server 200 outputs, from the loudspeaker 221, an instruction message to instruct the helmeted suspicious person to take off the helmet. Furthermore, if the suspicious person 290 does not take off the helmet even after a given time, the cloud server 200 outputs, from the loudspeaker 221, a guidance voice to urge a worker to escape (keep some distance from the suspicious person), and also outputs an intimidation sound from the loudspeaker 221. At the same time, the cloud server 200 closes and locks the cash drawer of the POS terminal 270. The correspondence between detected contents and an output message is registered in advance in the management database 210, and the crime and disaster prevention application program 204 decides countermeasure processing with reference to the management database 210 to control the crime and disaster prevention assistant devices. The crime and disaster prevention application program 204 controls the camera 222 to follow the suspicious person 290. Upon detecting a criminal act by the suspicious person 290, for example, opening of the cash drawer of the POS terminal 270, the crime and disaster prevention application program 204 operates the automatic color ball pitching machine 226 installed near the entrance. As soon as the suspicious person exits from the store, the crime and disaster prevention application program 204 throws a color ball at the suspicious person trying to run away along with image recognition.

The crime and disaster prevention application program 204 may change countermeasure processing in accordance with a customer stratum in the store. For example, if it is determined from an image captured by the camera 222 that there is an elderly person or child, the crime and disaster prevention application program 204 may instruct a worker to preferentially guide the customer via the display of the POS terminal 270.

If it is determined based on the status detection information detected by the vibration sensor or contactor control apparatus that a person breaks a wall or window to enter the store, an attempt may be made to produce the effect of daunting the intruder by disaster prevention countermeasure processing of, for example, discharging water from a sprinkler or discharging fire extinguishing spray. On the other hand, if it is known that there is a fryer in the store, which causes a fire when water is poured, it is desirable to put efforts on crime prevention using a ball and a camera.

When the fire sensor responds, the crime and disaster prevention application program 204 need only to output an evacuation guidance from the loudspeaker 221, as shown in FIG. 2C. The crime and disaster prevention application program 204 may find a fire occurrence location 281 from locations at which a plurality of fire sensors respond, and advise an evacuation route for guiding people to a door 282 farthest from the fire occurrence location 281 by using the POS terminal 270 and a signage panel 283. If the crime and disaster prevention application program 204 determines that a harmful gas is produced along with the fire based on the image captured by the camera 222, it may output an evacuation message from the loudspeaker 221 or display the message on the display of the POS terminal 270. For example, the evacuation message may be "please fill a plastic bag with air near the floor, and evacuate by crawling while breathing the air in the plastic bag".

When the vibration sensor detects a vibration, the crime and disaster prevention application program 204 may guide people to stay in the store or to evacuate outside via the loudspeaker 221, the signage panel, and the like in accordance with the magnitude of the vibration. The guidance may be provided together with earthquake information on the Internet. The guidance may give knowledge support in accordance with the characteristics of the store such as a sushi restaurant or tavern from a large store like a supermarket to a small store like a convenience store.

In consideration of the presence/absence of customers other than the intruder detected by the human sensor 223, the crime and disaster prevention application program 204 may determine whether to intimidate the intruder to expel him/her outside or confine the intruder so as to be readily caught. That is, if there is a customer, the crime and disaster prevention application program 204 outputs an intimidation sound from the loudspeaker 221 to expel the intruder; otherwise, the crime and disaster prevention application program 204 locks the door to confine the intruder as soon as the worker escapes. The intimidation message to the suspicious person may be changed depending on a pattern of a dangerous weapon along with analysis of an image of the criminal. If one intruder tries to threaten the worker using a knife, the crime and disaster prevention application program 204 may make the intruder to turn back by outputting an anthropomorphic sound "I'm here", and fire an intimidation flash to blind him/her. Then, during this time, the worker may go away from the criminal to maintain the safety only for escape. The crime and disaster prevention application program 204 may provide crime prevention knowledge to make it difficult for the criminal to run away even if he/she exits from the store.

The crime and disaster prevention application program 204 can control the stopper of a parking lot connected to the smart device 250 to output, from the contactor control apparatus, an instruction to prevent the criminal to run away by a car. Also, the crime and disaster prevention application program 204 can find information (the sex, height, and features of voice) about the suspicious person from an image and voice obtained by capturing the interior of the store by the camera 222. Furthermore, the crime and disaster prevention application program 204 can find the type, color, and registration number of the car of the runaway by collating an image obtained by capturing a storefront by the camera 222 with a car database prepared in advance. The crime and disaster prevention application program 204 automatically transmits information leading to the arrest of the criminal to a designated computer of the police. On the other hand, the crime and disaster prevention application program 204 may output such information to a peripheral device connected to the smart device 250.

As described above, the cloud server can control the crime and disaster prevention devices connected to the smart device without downloading any driver or application to the smart device. It is, therefore, possible to take a crime and disaster prevention countermeasure in the store only by connecting the crime and disaster prevention assistant devices prepared in the store to the smart device 250. That is, it becomes very easy to take a crime and disaster prevention countermeasure temporally and simply.

(Functional Arrangement of Cloud Server)

Figure 4:
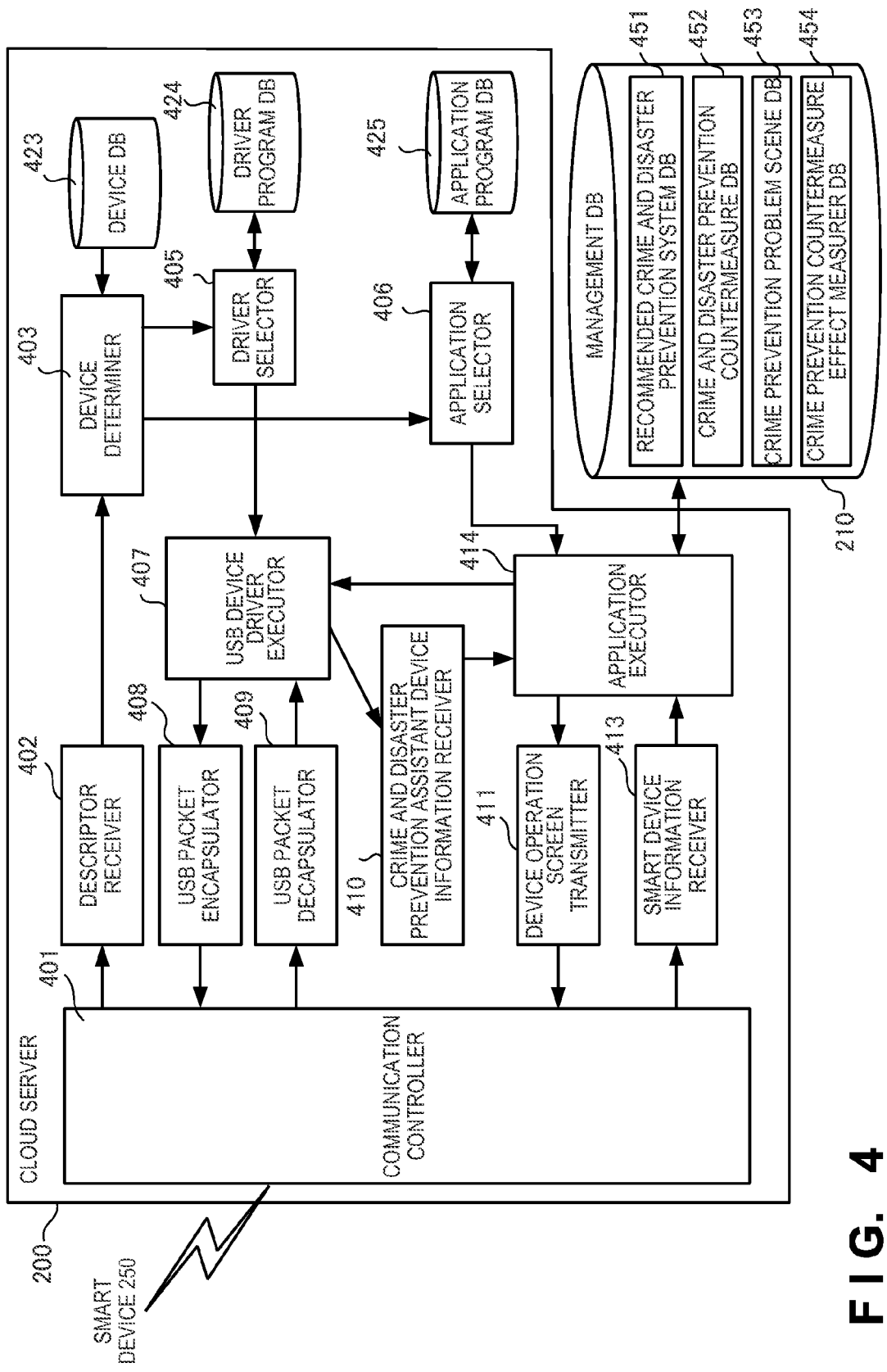
FIG. 4 is a block diagram showing the functional arrangement of the cloud server according to the second embodiment of the present invention.

FIG. 4 is a block diagram showing the functional arrangement of the cloud server 200. The cloud server 200 includes a descriptor receiver 402. When a crime and disaster prevention assistant device is connected to the smart device 250, the descriptor receiver 402 acquires a descriptor as specifying information for specifying the crime and disaster prevention assistant device via the smart device 250.

A device determiner 403 can specify the manufacturer ID and product ID of the crime and disaster prevention assistant device by searching a device database 423 (see FIG. 7E) using the descriptor acquired by the descriptor receiver 402.

A USB device driver executor 407 executes a driver program corresponding to the descriptor to control the crime and disaster prevention assistant device. A plurality of kinds of driver programs are prepared in a driver program database 424. A driver selector 405 selects a device driver necessary for driving the specified crime and disaster prevention assistant device from the driver program database 424 by using the manufacturer ID and product ID determined by the device determiner 403.

The USB device driver executor 407 generates a USB packet to be transmitted to the crime and disaster prevention assistant device connected via the smart device 250, and transfers the generated USB packet to a USB packet encapsulator 408. The USB packet encapsulator 408 performs IP encapsulation of the USB packet and transmits the resultant data to the smart device 250. On the other hand, a USB packet decapsulator 409 receives data having undergone IP encapsulation from the smart device 250, and decapsulates the data to extract a USB packet. The USB device driver executor 407 analyzes the received USB packet, generates a new USB packet to respond to the crime and disaster prevention assistant device, and reports the status of the crime and disaster prevention assistant device to an application executor 414.

When the USB device driver executor 407 executes an appropriate device driver, a crime and disaster prevention assistant device information receiver 410 receives status detection information from the crime and disaster prevention assistant device via the smart device 250.

The application executor 414 executes a crime and disaster prevention application corresponding to the crime and disaster prevention assistant device having the manufacturer ID and product ID specified by the descriptor. Based on the manufacturer ID and product ID determined by the device determiner 403, an application selector 406 selects, from an application program database 425, a crime and disaster prevention application which should be virtually executed in the smart device 250. The application executor 414 transmits device operation screen information to the smart device 250 via a device operation screen transmitter 411 and a communication controller 401. That is, the smart device 250 can display the display screen of a different crime and disaster prevention application in accordance with the type of the connected crime and disaster prevention assistant device (a combination of connected crime and disaster prevention assistant devices).

The application executor 414 acquires, via a smart device information receiver 413, the information acquired from the smart device 250, and accumulates store information in the management database 210. For example, the application executor 414 acquires time information at the time of crime prevention (including occurrence of a crime or disaster) from the smart device 250, and accumulates the time information together with the status detection information in the management database 210.

The application executor 414 acquires the status detection information from the crime and disaster prevention assistant device via the crime and disaster prevention assistant device information receiver 410. Examples of the status detection information are intrusion of a suspicious person, occurrence of a fire, and opening/closing or an abnormal vibration of a door.

The management database 210 includes a recommended crime and disaster prevention system database 451, a crime and disaster prevention countermeasure database 452, a crime prevention problem scene database 453, and a crime prevention countermeasure effect measurer database 454.

By referring to the recommended crime and disaster prevention system database 451 shown in FIG. 11, the cloud server 200 can present, to the smart device 250, the effective type of crime and disaster prevention assistant device to be connected. The user inputs the location of a store, a store scene (for example, an outdoor permanent store, an indoor permanent store (a mall or a store in a mall), or a temporary store for an event or the like), a store size, the number of workers, a budget, and the like from the smart device 250. The cloud server 200 orders a combination of crime and disaster prevention assistant devices which satisfies the above conditions from a rental company so as to deliver the combination of the devices to the store of the user.

The application executor 414 specifies countermeasure processing (for example, processing of turning on the crime prevention light, outputting an intimidation sound, outputting an escape guidance, outputting an evacuation guidance, locking the POS terminal 270, or operating a sprinkler) corresponding to the acquired status detection information with reference to the crime and disaster prevention countermeasure database 452 (see FIG. 12). The application executor 414 then controls the crime and disaster prevention assistant device via the smart device 250 based on the countermeasure processing.

The application executor 414 decides a report destination corresponding to an even which has occurred, such as a security company, the police, a fire station, or the general affairs department of a company, based on information of a plurality of sensors with reference to the crime and disaster prevention countermeasure database 452. In the case of a fire, this is reported to a fire station and general affairs department of a company. In the case of intrusion, this is reported to a security company, the police, and a company.

In addition to the above data, the crime and disaster prevention countermeasure database 452 may accumulate, for example, the acquired voice and facial expression of the suspicious person, the flinching degree of the criminal, and the level of safety of the worker about an event which has occurred. The crime and disaster prevention countermeasure database 452 may also accumulate knowledge that a crime prevention countermeasure using water should be avoided in a temporary store for deep-fried food.

The crime prevention problem scene database 453 accumulates the relationship between a crime history and a season or the environment of a store, which indicates, for example, that many elderly people become victims at an autumn festival, or many underwear theft cases and secret photographing crimes occur at a sea festival.

The crime prevention countermeasure effect measurer database 454 accumulates a person who measures the effect of a crime prevention countermeasure. For example, an employee, part-time employee, temporary employee, or customer who has reported is accumulated as an attribute, and used to prevent a problem. The crime prevention countermeasure effect measurer database 454 also records parameters indicating a sex and age, the total number of reporters and supporters (a report from one person, a couple, or several students), and position information of customers and workers at the time of reporting. The crime prevention countermeasure effect measurer database 454 accumulates information of a registrant at the time of growth of the database such as information indicating that the problem discovery rate of males is higher, a female, a worker, and an order from a customer. Furthermore, the crime prevention countermeasure effect measurer database 454 accumulate the relationship indicating that the problem occurrence rate becomes lower in the case of a male worker in his twenties, or the problem discovery rate is high when there are two or three workers. The crime prevention countermeasure effect measurer database 454 accumulates, as the problem report of the worker, information of other customers (positions, sexes, and ages) and external correlation with the customer position information (there was a customer on the widow side, who can be seen from the outside, or there was a customer at a location which is difficult to see from the outside) at the time of occurrence of a problem. This enables the application executor 414 to derive later the problem prevention effect, the problem discovery efficiency, and an operation for more readily preventing a problem depending on the age and sex of a person in charge.

In addition, the management database 210 may accumulate evidences leading to the arrest of a criminal and tracking down of the cause of a fire. For example, the management database 210 may find the model of the car (the type, color, and registration number of the car) of a runaway and criminal information (a sex, height information at the time of exiting from a door, the features of voice) from a captured image, and accumulate the data. The management database 210 may register later for each evidence whether the evidence has leaded to the arrest of the criminal, thereby growing the database about information effective for the arrest of the criminal.

(Functional Arrangement of Smart Device)

The functional arrangement of the smart device 250 will be described with reference to FIG. 5. The smart device 250 includes an operation unit 501 for accepting instructions and inputs from the user, an information transmitter 502 for transmitting the accepted instruction information and input information, and a communication controller 503. The communication controller 503 controls exchange with a network.

The smart device 250 also includes, as an input/output unit 505, a display unit 506 and an audio input/output unit 507 such as a microphone and a loudspeaker. A screen receiver 504 receives audio information and image information via the communication controller 503, and performs image output to the display unit 506 and audio output from the audio input/output unit 507.

Furthermore, the smart device 250 includes an environment information acquirer 508, a position detector 521, an image sensor 523, and a time detector 522. Position information detected by the position detector 521 by using the GPS or the like, time information detected by the time detector 522 such as a digital timepiece, image information captured using the image sensor 523, and the like are sent as environment information to the environment information acquirer 508. The environment information acquired by the environment information acquirer 508 is transmitted to the cloud server 200 via the information transmitter 502 and the communication controller 503.

Furthermore, the smart device 250 includes a USB connector 520 and a general-purpose USB driver executor 511. A descriptor acquirer 512 is configured to acquire a minimum descriptor from a connected USB device. The acquired descriptor is transferred to a descriptor transmitter 513 and transmitted to the cloud server 200 via the communication controller 503.

The smart device 250 further includes a decapsulator 514 and an encapsulator 515. At the time of communication with the cloud server 200, the decapsulator 514 and the encapsulator 515 respectively perform decapsulation processing and encapsulation processing for USB packets exchanged with the cloud server 200.

The decapsulator 514 and the encapsulator 515 function as a signal transfer controller 519. That is, the signal transfer controller 519 controls signal transfer between the crime and disaster prevention assistant device and the cloud server 200.

The smart device 250 stores a device database 524 representing the correspondence between a device descriptor, an interface descriptor, a vendor ID, and a product ID for a device whose device driver is installed in the local terminal. The device database 524 has a structure shown in FIG. 7E.

When the crime and disaster prevention assistant device is connected, the smart device 250 compares a device descriptor notified from the crime and disaster prevention assistant device with a device descriptor in the device database 524. If the device descriptor notified from the crime and disaster prevention assistant device coincides with a device descriptor in the device database 524, the smart device 250 determines that the crime and disaster prevention assistant device is a device processable by the local terminal. On the other hand, if these device descriptors do not coincide with each other, the smart device 250 determines that the crime and disaster prevention assistant device is a device unprocessable by the local terminal.

Note that a vendor ID and product ID in the device descriptor notified from the crime and disaster prevention assistant device may be extracted and compared with a vendor ID and product ID in the device database. In this case, if a coincident vendor ID and product ID exist in the device database 524, it is possible to determine that the crime and disaster prevention assistant device is processable by the local terminal. To the contrary, if neither the vendor ID nor the product ID is coincident, the smart device 250 can determine that the crime and disaster prevention assistant device is unprocessable by the local terminal.

(Processing Sequence of Overall System)

The processing sequence of the overall system will be summarized next with reference to a sequence chart shown in FIG. 6. First, the crime and disaster prevention assistant device is connected to the smart device 250 (S601). In response to this, the general-purpose USB driver executor 511 and descriptor acquirer 512 of the smart device 250 determine whether the local terminal includes a driver program and the like for acquiring status detection information from the crime and disaster prevention assistant device (S603).

Figure 9A:
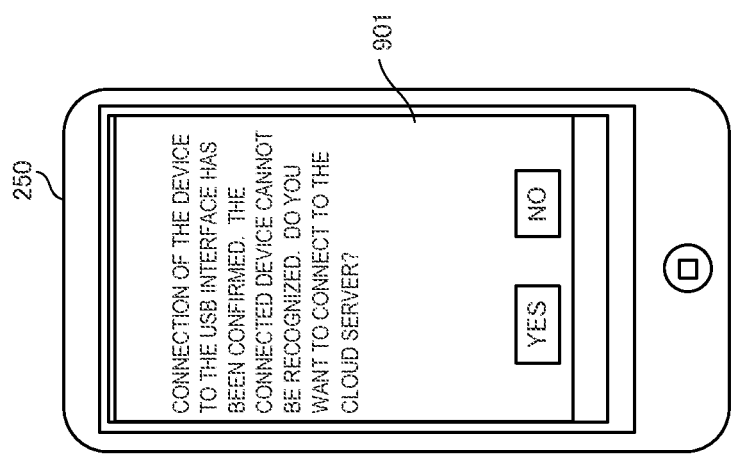
FIG. 9A is a view showing an example of a display screen displayed on the smart device according to the second embodiment of the present invention.

The capacity of the smart device 250 does not suffice for downloading and installing the driver programs and application programs of various kinds of crime and disaster prevention assistant devices. For this reason, the general-purpose USB driver executor 511 displays a connection confirmation screen 901 as shown in FIG. 9A to prompt the user to make confirmation. In accordance with an instruction from the user, the cloud server 200 is logged in from the smart device 250. Furthermore, the smart device 250 transmits a descriptor to the cloud server 200 by using the descriptor transmitter 513, and requests to acquire status detection information from the crime and disaster prevention assistant device under the initiative of the cloud server 200 (S605). However, the user of the smart device 250 needs to be a member of a cloud provider who runs the cloud server 200.

The cloud server 200 exchanges data with the crime and disaster prevention assistant device via the smart device 250 (S607), and specifies the crime and disaster prevention assistant device (S609). Then, the cloud server 200 selects and activates the crime and disaster prevention application program 204 corresponding to the crime and disaster prevention assistant device (S611).

A database selector 415 decides a management database corresponding to the connected crime and disaster prevention assistant device by using a correspondence table 1001 shown in FIG. 10 (S612). In the correspondence table 1001, information for specifying the crime and disaster prevention assistant device is associated with a company and store which should manage the crime and disaster prevention assistant device, and is also associated with the address of a management database in which data from the crime and disaster prevention assistant device should be registered. Hence, when the crime and disaster prevention assistant device is specified, the database selector 415 can decide a management database in which status detection information acquired by using the crime and disaster prevention assistant device should be saved. By only connecting the crime and disaster prevention assistant device to the smart device, the user can readily implement a crime and disaster prevention countermeasure.

The cloud server 200 selects a driver corresponding to the device specified in step S609 from the driver program database 424, and drives the driver (S613). Accordingly, the cloud server 200 can access the crime and disaster prevention assistant device via the smart device 250.

Figure 9B:
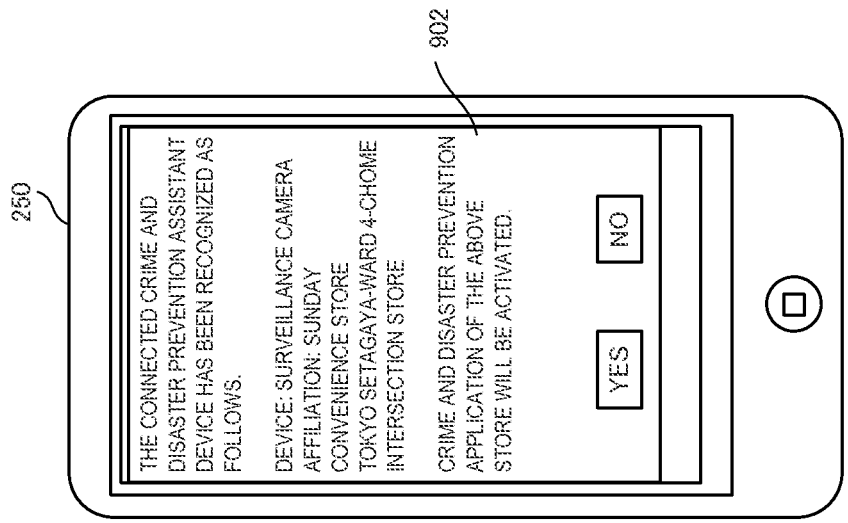
FIG. 9B is a view showing an example of a display screen displayed on the smart device according to the second embodiment of the present invention.

The crime and disaster prevention application program 204 first displays a confirmation screen 902 of the crime and disaster prevention assistant device as shown in FIG. 9B on the display unit 506 of the smart device 250, and prompts the user to confirm the crime and disaster prevention assistant device connected to the smart device 250. Note that the crime and disaster prevention application program 204 may determine whether the crime and disaster prevention assistant device connected to the smart device 250 is the same as a device requested in advance to be connected (device which needs to be connected in a store). When a device different from a predetermined device is connected, the smart device 250 may be notified by a predetermined screen or sound of a device which should be originally connected. That is, it is possible to guide the user to connect a desired crime and disaster prevention assistant device to the smart device 250.

The above-described processing is pre-processing, and then the process shifts to crime and disaster prevention processing. The application executor 414 which has activated the crime and disaster prevention application program 204 in the cloud server 200 sends a driving instruction to each crime and disaster prevention assistant device via the smart device 250. At this time, in step S617, a message corresponding to each of various crime and disaster prevention assistant devices is displayed on the display screen of the smart device 250. Examples of the message are "the surveillance camera will be driven", "the human sensor is driven, and the current number of customers is O", "output of an intimidation sound from the loudspeaker will be tested", and "no color ball is set in the automatic color ball pitching machine, so please set color balls".

In response to an instruction from the cloud server 200, the crime and disaster prevention assistant device starts driving (S619). The crime and disaster prevention assistant device then detects the status inside or outside the store to be monitored (S621), and transmits status detection information to the smart device 250 at regular intervals or at the time of occurrence of an abnormality.

The smart device 250 displays the received status detection information, and also transfers the status detection information to the cloud server 200. The smart device 250 can display a message, for example, "there is a suspicious person", "a vibration has been detected", or "smoke has been discharged".

Upon receiving the status detection information, the cloud server 200 advances to step S627, and determines necessary countermeasure processing with reference to the management database 210.

If some countermeasure processing is necessary, the process advances to step S629, and the cloud server 200 sends an instruction of countermeasure processing to the smart device 250. The smart device 250 relays the instruction to transmit it to the crime and disaster prevention assistant device (S631). In response to the instruction from the cloud server 200, the crime and disaster prevention assistant device performs the countermeasure processing.

The series of processes in steps S615 to S633 is the crime and disaster prevention processing, and the crime and disaster prevention application program repeatedly performs the crime and disaster prevention processing.

With the above series of processes, the cloud server 200 can create the crime and disaster prevention system.

(Processing Sequence in Cloud Server 200)

Figure 7A:
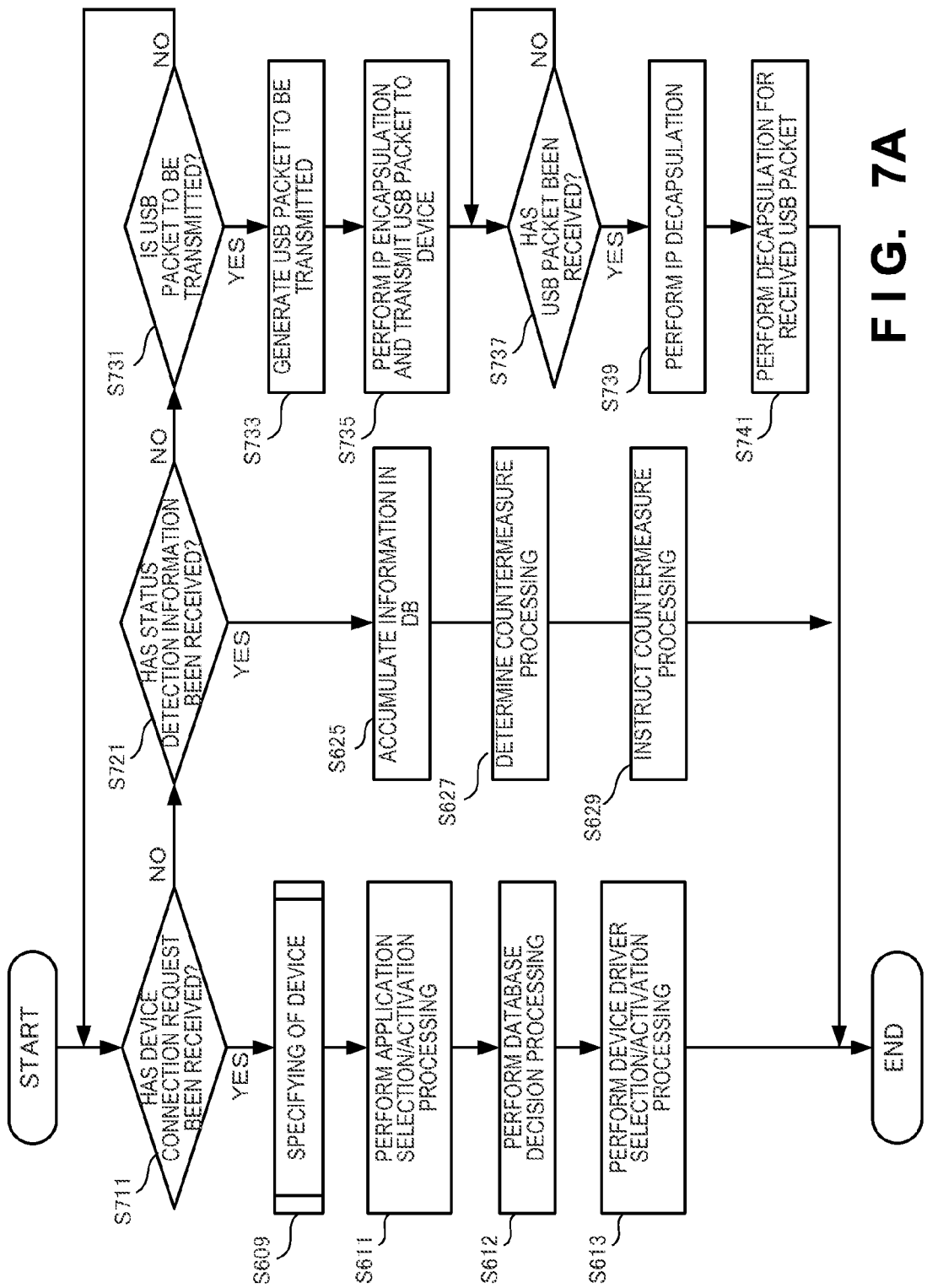
FIG. 7A is a flowchart illustrating a processing sequence performed by the cloud server according to the second embodiment of the present invention.

A more detailed processing sequence in the cloud server 200 will be explained with reference to FIG. 7A. If the cloud server 200 determines in step S711 that it has received a device connection request from the smart device 250, it advances to step S609 to perform device specifying processing. In step S611, the cloud server 200 selects a crime and disaster prevention application program based on the specified device, and activates it, as described above. Furthermore, the cloud server 200 specifies the management database 210 in step S612, and selects and activates a device driver in step S613.

On the other hand, if the cloud server 200 determines in step S721 that it has received status detection information, it performs status detection information accumulation processing in the management database 210 in step S625. In step S627, the cloud server 200 determines necessary countermeasure processing with reference to the management database 210. If the cloud server 200 determines that countermeasure processing is necessary, it advances to processing of transmitting an instruction of the countermeasure processing as a USB packet in step S629.

If the cloud server 200 determines in step S731 to transmit a USB packet, it advances to step S733 to generate a USB packet to be transmitted, and advances to step S735 to perform IP encapsulation and transmit the USB packet to the device. After that, the cloud server 200 waits for reception of a USB packet from the device (S737). Upon receiving a USB packet, the cloud server 200 performs IP decapsulation (S739) and performs decapsulation processing for the received USB packet (S741). By the processes in steps S731 to S741, the cloud server 200 can receive desired information from the crime and disaster prevention assistant device via the smart device 250.

<Descriptor Acquisition Method>

Figure 7B:
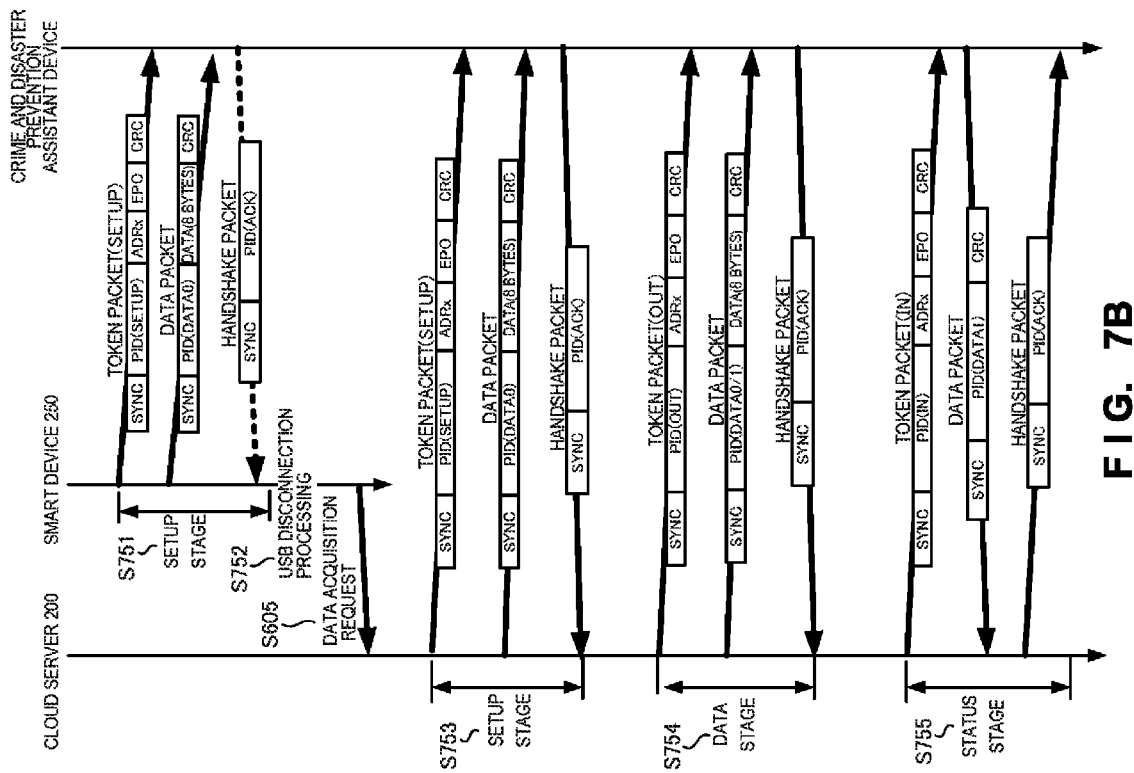
FIG. 7B is a sequence chart showing an example of packet transmission/reception processing in an information processing system according to the second embodiment of the present invention.
Figure 7C:
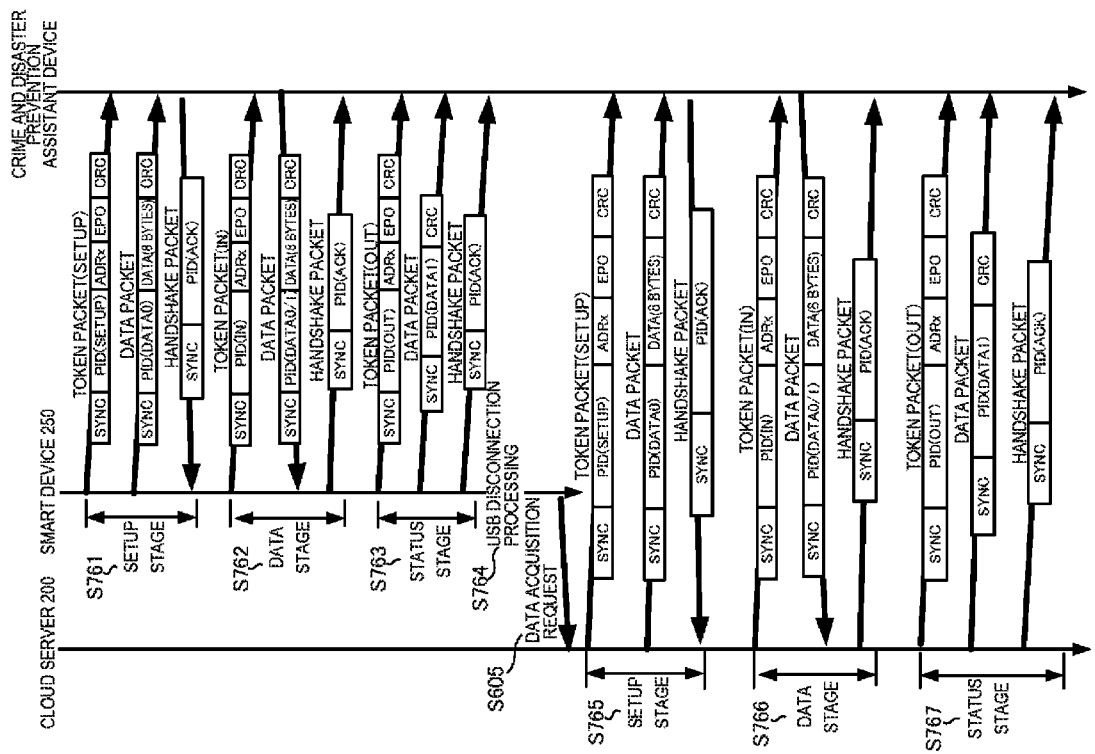
FIG. 7C is a sequence chart showing another example of the packet transmission/reception processing in the information processing system according to the second embodiment of the present invention.
Figure 7D:
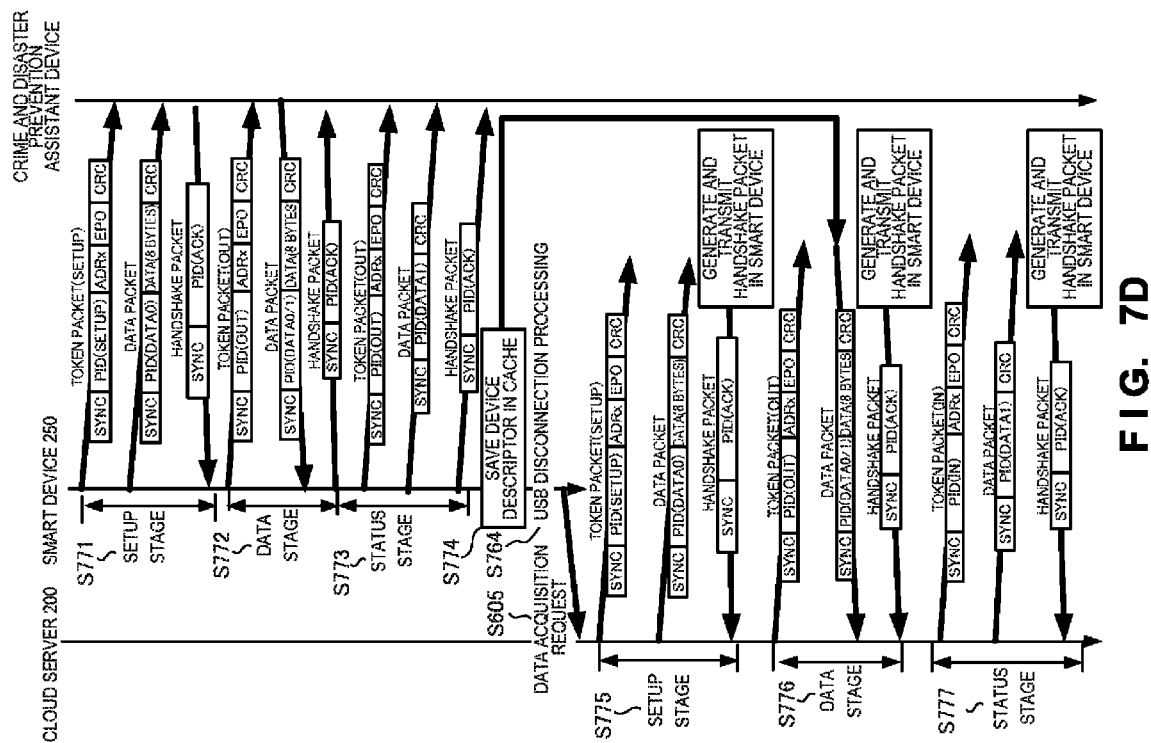
FIG. 7D is a sequence chart showing still other example of the packet transmission/reception processing in the information processing system according to the second embodiment of the present invention.

FIGS. 7B, 7C, and 7D are sequence charts for explaining in more detail the device specifying processing described in steps S601 to S609. FIGS. 7B, 7C, and 7D show packet data exchanged between the cloud server 200, the smart device 250, and the crime and disaster prevention assistant device.

In FIG. 7B, when the crime and disaster prevention assistant device is connected to the smart device 250, the smart device 250 transmits a token packet and a data packet to the crime and disaster prevention assistant device in setup stage S751. In response to this, the crime and disaster prevention assistant device transmits a handshake packet to the smart device 250. Based on whether a proper handshake packet is returned, the smart device 250 can determine whether the local terminal can control the crime and disaster prevention assistant device.

For example, if a device assumes in advance connection to the smart device 250, it returns a proper handshake packet, and a data stage and a status stage continue. The device can be controlled by driving a device driver prepared in the smart device 250 in correspondence with the acquired device descriptor. However, very few devices assume connection to the smart device 250. If no handshake packet is returned in setup stage S701, USB disconnection processing is performed (S752), and the smart device 250 transmits a data acquisition request to the cloud server 200 (S605).

Then, the cloud server 200 performs again setup stage S753 with the crime and disaster prevention assistant device via the smart device 250, and advances to data stage S754 to acquire device information such as a device descriptor. The cloud server 200 includes in advance many drivers and data conversion modules so that it can be connected to various crime and disaster prevention assistant devices present in the world. Thus, setup stage S753, data stage S754, and status stage S755 smoothly proceed between the cloud server 200 and the crime and disaster prevention assistant device, and communication with the crime and disaster prevention assistant device is established properly.

FIG. 7C shows a sequence when the crime and disaster prevention assistant device sends back a handshake packet, but the smart device 250 does not have a driver corresponding to a device descriptor acquired from the crime and disaster prevention assistant device. In this case, setup stage S761, data stage S762, and status stage S763 are performed between the smart device 250 and the crime and disaster prevention assistant device. If it is determined that the smart device 250 does not have a device driver corresponding to a device descriptor acquired through these three stages, USB disconnection processing S764 is performed. Then, the smart device 250 transmits a data acquisition request to the cloud server 200 (S605).

The smart device 250 requests the cloud server 200 to establish communication with the crime and disaster prevention assistant device. After the USB connection between the smart device 250 and the crime and disaster prevention assistant device is disconnected, the cloud server 200 performs again setup stage S765, data stage S766, and status stage S767. As a result, the cloud server 200 can directly acquire a device descriptor from the crime and disaster prevention assistant device, and drive a driver corresponding to the device.

FIG. 7D shows processing when a device descriptor acquired in setup stage S771 and data stage S772 between the smart device 250 and the crime and disaster prevention assistant device is cached in the smart device 250. Before performing USB disconnection processing, the acquired device descriptor is cached in the smart device 250 (S774). The smart device 250 transmits a data acquisition request to the cloud server 200 (S605).

After the connection between the smart device 250 and the crime and disaster prevention assistant device is temporarily disconnected, communication establishment processing with the crime and disaster prevention assistant device starts under the initiative of the cloud server 200 (S775 to S777). In this case, in setup stage S775, the smart device 250 generates a handshake packet and transmits it to the cloud server 200 without transmitting a setup token packet and a data packet to the crime and disaster prevention assistant device. In data stage S776, the smart device 250 receives a token packet and a data packet from the cloud server 200.

The smart device 250 reads out the device descriptor from the cache and transmits it to the cloud server 200 without transmitting these packets to the crime and disaster prevention assistant device. That is, since processing of acquiring a device descriptor from the crime and disaster prevention assistant device can be omitted, the process can efficiently restart after communication disconnection from the crime and disaster prevention assistant device.

(Device Specifying Table)

Figure 7E:
FIG. 7E is a table showing the structure of a device database used in the information processing system according to the second embodiment of the present invention.

Similarly to the device database 524 shown in FIG. 7E, the device database 423 stores the correspondence between a device descriptor, an interface descriptor, a vendor ID, and a product ID.

When the crime and disaster prevention assistant device is connected to the smart device 250, the cloud server 200 searches the device database 423 for the device descriptor acquired from the crime and disaster prevention assistant device via the smart device 250. Then, the cloud server 200 specifies a corresponding vendor ID and product ID. The cloud server 200 selects a device driver corresponding to the vendor ID and product ID from the driver program database 424, and executes it.

Note that the device database 423 stores the correspondence between a device descriptor, an interface descriptor, a vendor ID, and a product ID, but the present invention is not limited to this. For example, the device database 423 may further store the correspondence between a device descriptor and a trade name. In this case, the trade name of the crime and disaster prevention assistant device may be specified from the device descriptor by using the device database 423, and displayed on the screen of the smart device 250. This enables the user of the smart device 250 to confirm that "the cloud server 200 has recognized the crime and disaster prevention assistant device connected by himself/herself", and feel greatly assured.

(USB Connection Processing)

Signals to be exchanged between the cloud server 200, the smart device 250, and the crime and disaster prevention assistant device until USB communication is established will be explained in more detail with reference to FIGS. 8A to 8D. Particularly, an example in which a device descriptor is saved in the cache, as described with reference to FIG. 7D, will be explained.

In step S801, the crime and disaster prevention assistant device is connected to the smart device 250 and turned on. In step S802, the smart device 250 starts USB connection processing to the crime and disaster prevention assistant device, and transmits a reset signal. In step S803, the smart device 250 designates an address to the crime and disaster prevention assistant device. This address is added to packets to be subsequently exchanged between the smart device 250 and the crime and disaster prevention assistant device.

In step S804, the smart device 250 performs the processing of a "GET DESCRIPTOR" command to acquire a descriptor from the crime and disaster prevention assistant device. The processing of the "GET DESCRIPTOR" command is the same as that in steps S721 to S723 described with reference to FIG. 7D, and a detailed description thereof will be omitted. After a descriptor request is transmitted to the crime and disaster prevention assistant device (S805), the crime and disaster prevention assistant device transmits, to the smart device 250, a device descriptor stored in an endpoint 0 area (S806 and S807). In status stage S723, the smart device 250 transmits an acknowledge signal (ACK) to the crime and disaster prevention assistant device.

Upon acquiring the device descriptor, the smart device 250 saves it in the cache (S774). By using the device descriptor, the smart device 250 determines whether it can control the device (S603). If the smart device 250 determines that it cannot control the device, it advances to step S811 to perform USB disconnection processing. At the same time, the smart device 250 requests the cloud server 200 to control the crime and disaster prevention assistant device (S812).

In step S813, the cloud server 200 starts processing to control the crime and disaster prevention assistant device, and transmits a reset signal to the crime and disaster prevention assistant device via the smart device 250. In step S815, the cloud server 200 performs a "SET ADDRESS" command and designates an address to the crime and disaster prevention assistant device.

Furthermore, the cloud server 200 performs a "GET DESCRIPTOR" command (S816) and a "GET CONFIGURATION" command (S824) to the crime and disaster prevention assistant device via the smart device 250 (S823). More specifically, in step S817, the cloud server 200 sends a "GET DESCRIPTOR" command to the smart device 250. In step S818, the smart device 250 reads out the device descriptor saved in the cache, and transmits it to the cloud server 200 (S819).

In step S825, the crime and disaster prevention assistant device transmits a configuration descriptor stored in the endpoint 0 area. Then, the cloud server 200 performs bulk transfer to the crime and disaster prevention assistant device via the smart device 250 (S826). Then, the crime and disaster prevention assistant device reads out status detection information (S827), and transmits it to the cloud server 200 via the smart device 250.

If the smart device 250 determines in step S603 based on the device descriptor of the crime and disaster prevention assistant device that the crime and disaster prevention assistant device is not a controllable device, it advances to step S828 of FIG. 8B. In steps S828 and S829, configuration descriptor acquisition processing is performed. In response to this, the crime and disaster prevention assistant device transmits the configuration descriptor to the smart device 250. In step S832, the smart device 250 saves the acquired configuration descriptor in the cache. In step S603, the smart device 250 determines based on the configuration descriptor whether the crime and disaster prevention assistant device is a device controllable by the smart device 250. If the smart device 250 determines that the crime and disaster prevention assistant device is not controllable, it advances to step S833 to disconnect the USB connection between the smart device 250 and the crime and disaster prevention assistant device.

After the USB connection is disconnected, the smart device 250 requests the cloud server 200 to control the crime and disaster prevention assistant device. In response to this control request, the cloud server 200 starts USB control, and also transmits a reset signal to the crime and disaster prevention assistant device via the smart device 250 (S835). Subsequently, the cloud server 200 performs a "SET ADDRESS" command (S836), and designates an address to the crime and disaster prevention assistant device. Further, the cloud server 200 requests a descriptor of the smart device 250 by a "GET DESCRIPTOR" command (S837). The smart device 250 reads out the device descriptor from the cache (S839), and sends it back to the cloud server 200 (S840), instead of relaying the request to the crime and disaster prevention assistant device.

Furthermore, the cloud server 200 executes a "GET CONFIGURATION" command to the crime and disaster prevention assistant device via the smart device 250 (S841). The smart device 250 reads out the configuration descriptor stored in the cache, and transmits it to the cloud server 200 (S843), instead of transmitting the command to the crime and disaster prevention assistant device. Then, the cloud server 200 performs bulk transfer to the crime and disaster prevention assistant device via the smart device 250 (S844). The crime and disaster prevention assistant device reads out status detection information (S845), and transmits it to the cloud server 200 via the smart device 250.

Figure 8A:
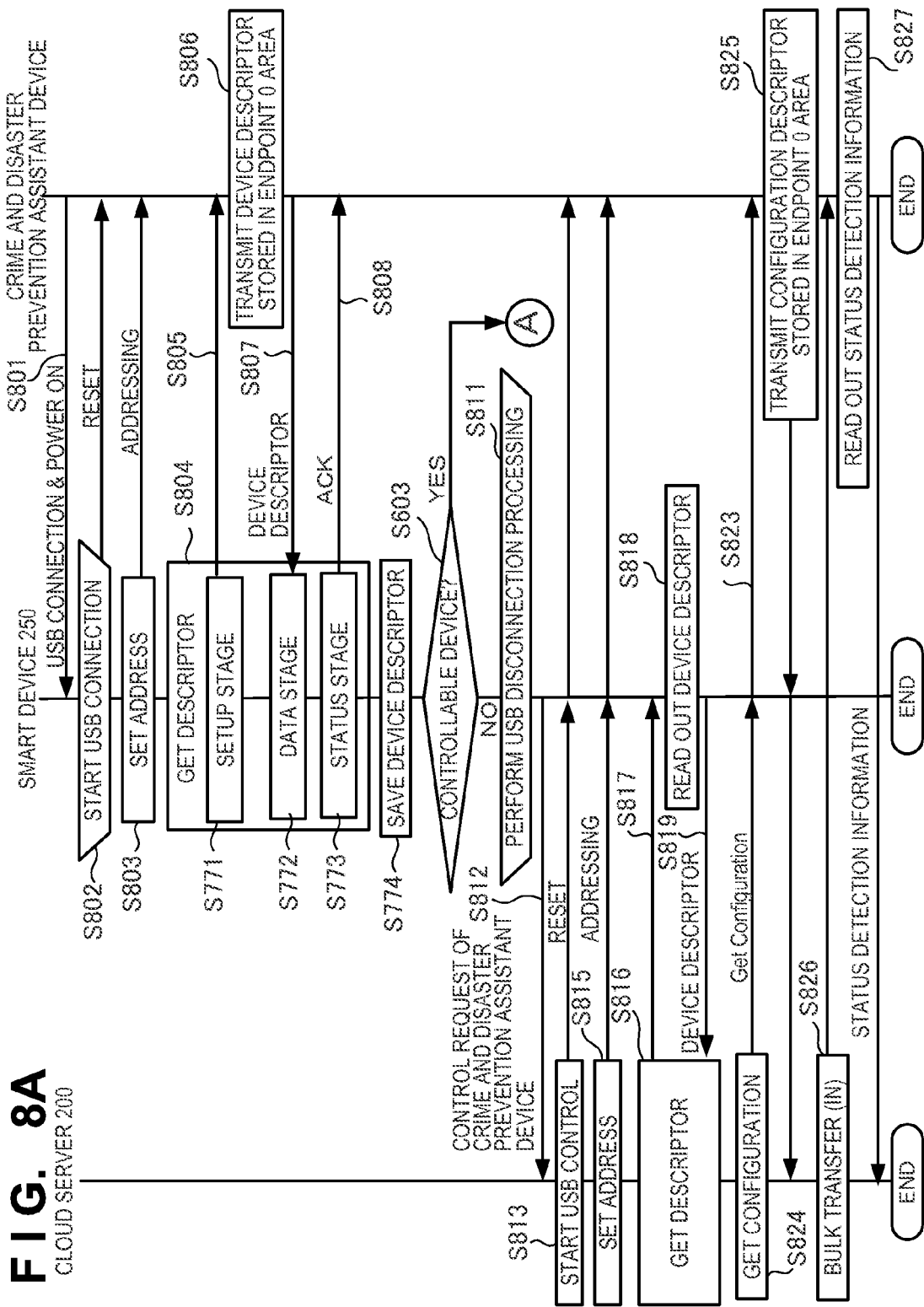
FIG. 8A is a sequence chart showing an example of communication establishment processing between a server and a device in the information processing system according to the second embodiment of the present invention.
Figure 8C:
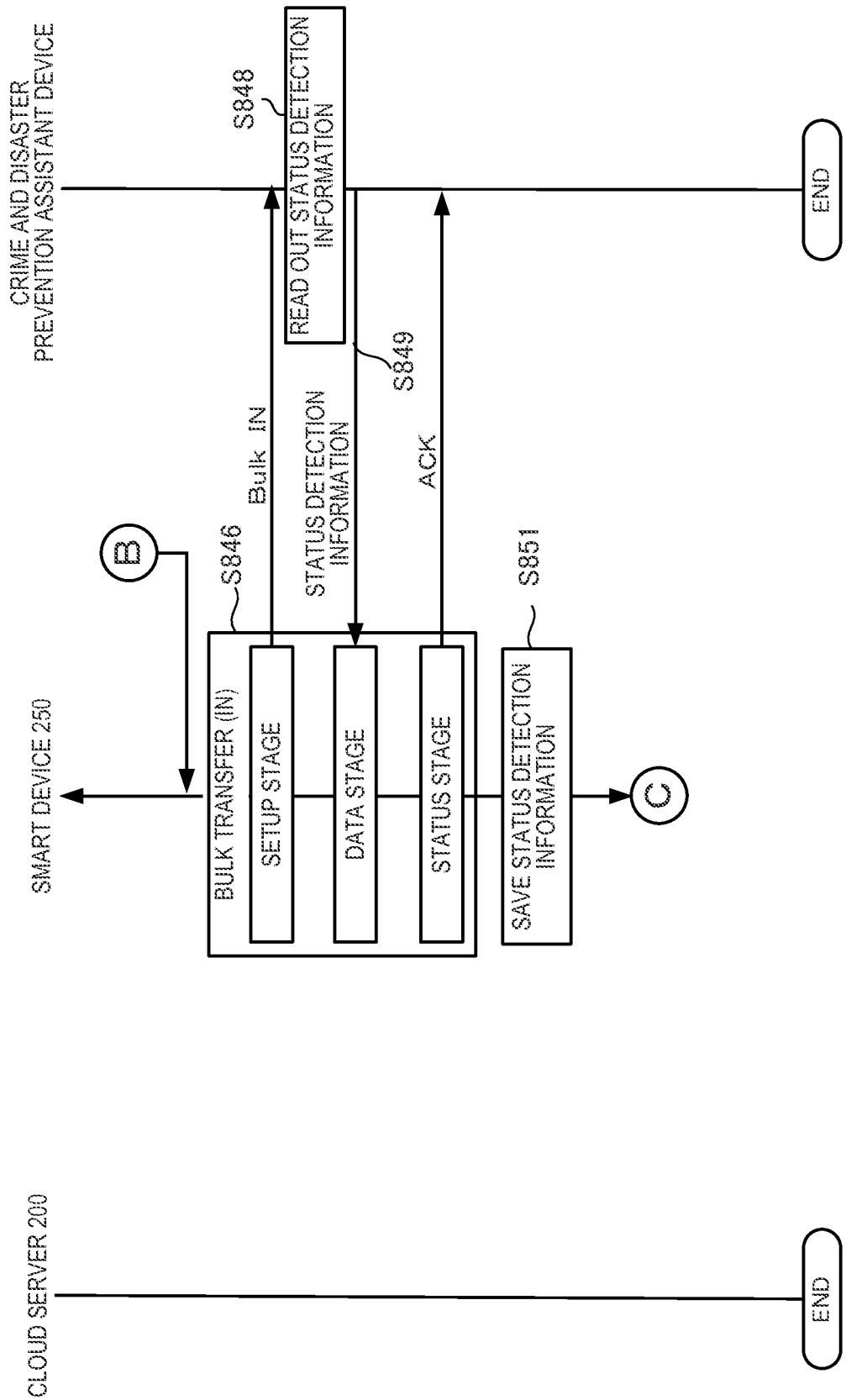
FIG. 8C is a sequence chart showing the example of the communication establishment processing between the server and the device in the information processing system according to the second embodiment of the present invention.

If the smart device 250 determines in step S603 based on the configuration descriptor that the crime and disaster prevention assistant device is a controllable device (B), it advances to bulk transfer in step S846 of FIG. 8C. Even in bulk transfer, the setup stage, the data stage, and the status stage are performed to read out status detection information from the crime and disaster prevention assistant device and transmit it to the smart device 250 (S849). Upon receiving the readout status detection information, the smart device 250 saves it in the cache (S851), and advances to step S856 of FIG. 8D.

Figure 8D:
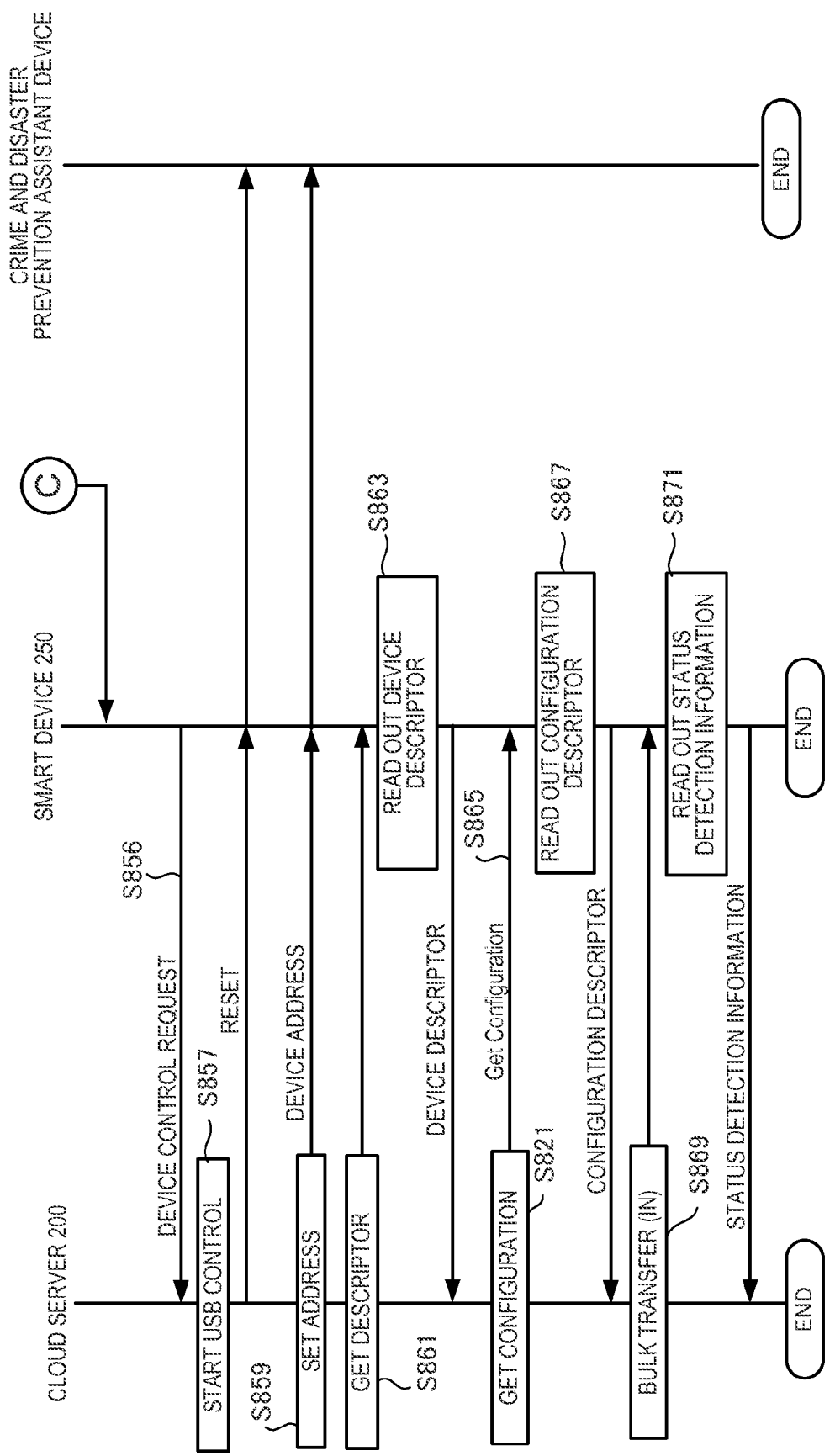
FIG. 8D is a sequence chart showing the example of the communication establishment processing between the server and the device in the information processing system according to the second embodiment of the present invention.

In step S856 of FIG. 8D, the smart device 250 requests the cloud server 200 to control the crime and disaster prevention assistant device. In response to this control request, the cloud server 200 starts USB control, and also transmits a reset signal to the crime and disaster prevention assistant device via the smart device 250 (S857). Then, the cloud server 200 performs a "SET ADDRESS" command (S859), and designates an address to the crime and disaster prevention assistant device. Furthermore, the cloud server 200 requests a descriptor of the smart device 250 by a "GET DESCRIPTOR" command (S861). The smart device 250 reads out the device descriptor from the cache (S863), and sends it back to the cloud server 200, instead of relaying the request to the crime and disaster prevention assistant device.

Furthermore, the cloud server 200 executes a "GET CONFIGURATION" command to the crime and disaster prevention assistant device via the smart device 250 (S865). The smart device 250 reads out the configuration descriptor saved in the cache, and transmits it to the cloud server 200 (S867), instead of relaying the command.

The cloud server 200 performs bulk transfer to the crime and disaster prevention assistant device via the smart device 250 (S869). The smart device 250 reads out the information saved in the cache (S871), and transmits it to the cloud server 200.

According to the above-described sequence, communication between the cloud server 200 and the crime and disaster prevention assistant device can be efficiently performed by appropriately using the cache of the smart device 250.

According to this embodiment, the specifying information of the crime and disaster prevention assistant device is acquired via the smart device to specify and execute the driver and application. Therefore, by only connecting the crime and disaster prevention assistant device to the smart device, a crime and disaster prevention countermeasure can be readily implemented. That is, it is possible to very easily create a crime and disaster prevention system in a temporary store or the like by using the crime and disaster prevention assistant device and smart device.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program.

This application claims the benefit of Japanese Patent Application No. 2012-222559 filed on Oct. 4, 2012, which is hereby incorporated by reference herein in its entirety.

The invention claimed is:

1. An information processing server comprising:
   an acquirer that, when a crime and disaster prevention assistant device is locally connected to a portable communication terminal, acquires specifying information for specifying the crime and disaster prevention assistant device from the crime and disaster prevention assistant device via the portable communication terminal;
   a driver executor that executes a driver program corresponding to the specifying information to control the crime and disaster prevention assistant device without downloading a program into the portable communication terminal; and
   an application executor that executes a crime and disaster prevention application program corresponding to the specifying information to acquire status detection information detected by the crime and disaster prevention assistant device connected to the portable communication terminal, specifies countermeasure processing corresponding to the acquired status detection information with reference to a management database, and controls the crime and disaster prevention assistant device via the portable communication terminal based on the countermeasure processing.

2. The information processing server according to claim 1, wherein the crime and disaster prevention assistant device includes at least one of a crime prevention light, a loudspeaker, a surveillance camera, and door open/close sensor.

3. The information processing server according to claim 1, wherein said application executor acquires time information of the portable communication terminal at the time of crime prevention from the portable communication terminal, and accumulate the time information together with the status detection information in the management database.

4. The information processing server according to claim 1, wherein
   the portable communication terminal is connected to a camera and loudspeaker as the crime and disaster prevention assistant devices, and
   when a suspicious person is found in an image captured by the camera, said application executor controls the loudspeaker to output an intimidation sound.

5. The information processing server according to claim 1, wherein
   the portable communication terminal is connected to a camera and loudspeaker as the crime and disaster prevention assistant devices, and
   when a suspicious person is found in an image captured by the camera, said application executor outputs an instruction message from the loudspeaker, and if the suspicious person does not obey the instruction message, outputs a guidance voice to urge a worker to escape and controls the loudspeaker to output an intimidation sound.

6. The information processing server according to claim 1, wherein
the portable communication terminal is connected to a camera and cash drawer as the crime and disaster prevention assistant devices, and
when a suspicious person is found in an image captured by the camera, said application executor closes and locks the cash drawer.

7. The information processing server according to claim 1, wherein
the portable communication terminal is connected to a camera and pitching machine as the crime and disaster prevention assistant devices, and
when a suspicious person is found in an image captured by the camera, said application executor controls the camera to follow the suspicious person, and controls the pitching machine to throw a color ball at the suspicious person.

8. The information processing server according to claim 1, wherein
the portable communication terminal is connected to a display as the crime and disaster prevention assistant device, and
if a fire is detected based on the status detection information from the crime and disaster prevention assistant device, said application executor controls to display an evacuation message on the display.

9. The information processing server according to claim 8, wherein if it is determined from an image captured by a camera as the crime and disaster prevention assistant device that a harmful gas is produced along with the fire, said application executor displays, on the display, the evacuation message to fill a bag with air near a floor and evacuate by crawling while breathing the air in the bag.

10. The information processing server according to claim 1, wherein
the portable communication terminal is connected to a loudspeaker, a human sensor that detects the presence/absence of a customer in a store, and an opening/closing apparatus that opens/closes a door of the store, which serve as the crime and disaster prevention assistant devices, and
if it is determined using the human sensor that there is a customer in the store, said application executor outputs an intimidation sound from the loudspeaker so as to expel the suspicious person, and if it is determined using the human sensor that there is no customer in the store, said application executor closes and locks the door of the store using the opening/closing apparatus.

11. The information processing server according to claim 1, wherein upon detecting that the crime and disaster prevention assistant device is connected to the portable communication terminal, said application executor transmits, to the portable communication terminal, a message describing where and how the crime and disaster prevention assistant device is installed.

12. The information processing server according to claim 1, wherein said application executor accumulates, as an attribute, a person who has reported an effect of a crime prevention countermeasure in a crime prevention countermeasure effect measurer database, and uses the attribute to prevent a problem.

13. An information processing method comprising:
acquiring, when a crime and disaster prevention assistant device is locally connected to a portable communication terminal, specifying information for specifying the crime and disaster prevention assistant device from the crime and disaster prevention assistant device via the portable communication terminal;
executing a driver program corresponding to the specifying information to control the crime and disaster prevention assistant device without downloading a program into the portable communication terminal; and
executing a crime and disaster prevention application program corresponding to the specifying information to acquire status detection information detected by the crime and disaster prevention assistant device connected to the portable communication terminal, specifying countermeasure processing corresponding to the acquired status detection information with reference to a management database, and controlling the crime and disaster prevention assistant device via the portable communication terminal based on the countermeasure processing.

14. A non-transitory computer readable medium storing an information processing program that, when executed by a computer, causes the computer to execute a method, the method comprising:
acquiring, when a crime and disaster prevention assistant device is locally connected to a portable communication terminal, specifying information for specifying the crime and disaster prevention assistant device from the crime and disaster prevention assistant device via the portable communication terminal;
executing a driver program corresponding to the specifying information to control the crime and disaster prevention assistant device without downloading a program into the portable communication terminal; and
executing a crime and disaster prevention application program corresponding to the specifying information to acquire status detection information detected by the crime and disaster prevention assistant device connected to the portable communication terminal, specifying countermeasure processing corresponding to the acquired status detection information with reference to a management database, and controlling the crime and disaster prevention assistant device via the portable communication terminal based on the countermeasure processing.

15. A portable communication terminal comprising:
a determiner that, when locally connected to a crime and disaster prevention assistant device, determines whether a local terminal can control the crime and disaster prevention assistant device;
a requester that, when it is determined that the local terminal cannot control the crime and disaster prevention assistant device, requests control of the crime and disaster prevention assistant device by accessing a server;
a signal transfer controller that controls, without downloading a program into the portable communication terminal, signal transfer between the crime and disaster prevention assistant device and the server so that communication between the crime and disaster prevention assistant device and the server can be established and the server can acquire status detection information detected by the crime and disaster prevention assistant device from the crime and disaster prevention assistant device; and a receiver that receives, from the server, screen information generated by executing, by the server, a crime and disaster prevention application program corresponding to the crime and disaster prevention assistant device.

16. A control method of a portable communication terminal, comprising:

determining, when locally connected to a crime and disaster prevention assistant device, whether a local terminal can control the crime and disaster prevention assistant device;

requesting, when it is determined that the local terminal cannot control the crime and disaster prevention assistant device, control of the crime and disaster prevention assistant device by accessing a server;

controlling, without downloading a program into the portable communication terminal, signal transfer between the crime and disaster prevention assistant device and the server so that communication between the crime and disaster prevention assistant device and the server can be established and the server can acquire status detection information detected by the crime and disaster prevention assistant device from the crime and disaster prevention assistant device; and receiving, from the server, screen information generated by executing, by the server, a crime and disaster prevention application program corresponding to the crime and disaster prevention assistant device.

17. A non-transitory computer readable medium storing a control program of a portable communication terminal for causing a computer to execute a method, comprising:

determining, when locally connected to a crime and disaster prevention assistant device, whether a local terminal can control the crime and disaster prevention assistant device;

requesting, when it is determined that the local terminal cannot control the crime and disaster prevention assistant device, control of the crime and disaster prevention assistant device by accessing a server;

controlling, without downloading a program into the portable communication terminal, signal transfer between the crime and disaster prevention assistant device and the server so that communication between the crime and disaster prevention assistant device and the server can be established and the server can acquire status detection information detected by the crime and disaster prevention assistant device from the crime and disaster prevention assistant device; and receiving, from the server, screen information generated by executing, by the server, a crime and disaster prevention application program corresponding to the crime and disaster prevention assistant device.

18. An information processing system comprising:

an information processing apparatus; and a portable communication terminal, said information processing apparatus comprising an acquirer that, when a crime and disaster prevention assistant device is locally connected to the portable communication terminal, acquires specifying information for specifying the crime and disaster prevention assistant device from the crime and disaster prevention assistant device via the portable communication terminal, a driver executor that executes a driver program corresponding to the specifying information to control the crime and disaster prevention assistant device without downloading a program into the portable communication terminal, and an application executor that executes a crime and disaster prevention application program corresponding to the specifying information to acquire status detection information detected by the crime and disaster prevention assistant device connected to the portable communication terminal, specifies countermeasure processing corresponding to the acquired status detection information with reference to a management database, and controls the crime and disaster prevention assistant device via the portable communication terminal based on the countermeasure processing.

* * * * *